US008155942B2

(12) United States Patent
Sarma et al.

(10) Patent No.: US 8,155,942 B2
(45) Date of Patent: Apr. 10, 2012

(54) SYSTEM AND METHOD FOR EFFICIENT WELL PLACEMENT OPTIMIZATION

(75) Inventors: Pallav Sarma, San Ramon, CA (US); Wen Hsiung Chen, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 381 days.

(21) Appl. No.: 12/389,227

(22) Filed: Feb. 19, 2009

(65) Prior Publication Data
US 2009/0216505 A1 Aug. 27, 2009

Related U.S. Application Data

(60) Provisional application No. 61/030,370, filed on Feb. 21, 2008.

(51) Int. Cl.
G06G 7/48 (2006.01)
G01V 1/40 (2006.01)
G01V 3/18 (2006.01)
G01V 5/04 (2006.01)
G01V 9/00 (2006.01)

(52) U.S. Cl. ................................. 703/10; 703/6; 702/6
(58) Field of Classification Search ................. 703/6, 10
See application file for complete search history.

(56) References Cited

U.S. PATENT DOCUMENTS

| 3,854,323 | A | | 12/1974 | Hearn et al. |
| 4,147,228 | A | * | 4/1979 | Bouyoucos ............... 181/119 |
| 4,926,942 | A | | 5/1990 | Profrock, Jr. |
| 5,113,941 | A | | 5/1992 | Donovan |
| 5,335,730 | A | | 8/1994 | Cotham, III |
| 5,937,946 | A | | 8/1999 | Streetman |
| 6,119,781 | A | | 9/2000 | Lemetayer et al. |
| 6,873,267 | B1 | | 3/2005 | Tubel et al. |
| 6,896,055 | B2 | | 5/2005 | Koithan |

(Continued)

FOREIGN PATENT DOCUMENTS
WO  WO2006066166  6/2006

OTHER PUBLICATIONS

Glynn, J.E. et al. ,"A Diffusion Approximation for a Network of Reservoirs with Power Law Release Rule", 1996, Stochastic Hydrology and Hydraulics, Springer-Verlag.*

(Continued)

*Primary Examiner* — Paul Rodriguez
*Assistant Examiner* — Cedric D Johnson
(74) *Attorney, Agent, or Firm* — Christopher D. Northcutt; Craig R. Vander Ploeg

(57) ABSTRACT

The disclosed methods, systems, and software are described for optimizing well placement in a reservoir field. A geological model of a reservoir field, a grid defining a plurality of cells, one or more wells to be located within the plurality of cells, and an objective function are all provided. The geological model is associated with the grid defining the plurality of cells. The locations of the wells are represented by continuous well location variables associated with a continuous spatial domain. A gradient of the objective function is calculated responsive to the continuous well location variables. The locations of the wells are then adjusted responsive to the calculated gradient of the objective function. Iterative calculation of the gradient and adjustment of the wells continue until the well locations are optimized. A visual representation of the reservoir field can be generated based on the optimized well placements.

18 Claims, 18 Drawing Sheets

U.S. PATENT DOCUMENTS

| | | |
|---|---|---|
| 7,028,538 B2 | 4/2006 | Gysling |
| 2003/0225606 A1* | 12/2003 | Raghuraman et al. ............ 705/7 |
| 2005/0092523 A1 | 5/2005 | McCaskill et al. |
| 2006/0184329 A1* | 8/2006 | Rowan et al. ................... 702/50 |

OTHER PUBLICATIONS

Sarma, Pallav et al., "Efficient Real-Time Reservoir Management Using Adjoint-based Optimal Control and Model Updating", Aug. 8, 2005.*

The Interstate Technology and Regulatory Council, "Technology Overview: Overview of Groundwater Remediation Technologies for MTBE and TBA", Feb. 2005, pp. 20-23.*

Bangerth, W. et al., "On Optimization Algorithms for the Reservoir Oil Well Placement Problem", Aug. 17, 2006.*

Wang, Chunhong et al., "Optimal Well Placement for Production Optimization", Oct. 14, 2007, SPE Eastern Regional Meeting, Society of Petroleum Engineers.*

Handels, M. et al., "Adjoint-Based Well-Placement Optimization Under Production Constraints", Feb. 28, 2007, SPE Reservoir Simulation Symposium, Society of Petroleum Engineers.*

Drew, J. et al. "Automated Microseismic Event Detection and Location by Continuous Spatial Mapping", Oct. 9-12, 2005, SPE Annual Technical Conference and Exhibition, Society of Petroleum Engineers.*

Gunduz, Orhan, et al., "A Dirac-δ Function Notation for Source/Sink Terms in Groundwater Flow", Journal of Hydrologic Engineering, Sep./Oct. 2005, pp. 420-227.

Gunduz, Orhan, et al., Errata for "A Dirac-δ Function Notation for Source/Sink Terms in Groundwater Flow", Journal of Hydrologic Engineering, Jan./Feb. 2006, Errata p. 89.

Wang, Chunhong, et al., "Optimal Well Placement for Production Optimization, Society of Petroleum Engineers", 2007, 5 pages.

Zandvliet, M.J., et al., "Adjoint-Based Well-Placement Optimization Under Production Constraints", SPE Journal, Dec. 2008, pp. 392-399.

Chunghong Wang et al., "Optimal Well Placement for Production", Oct. 2007, SPE111154, SPE Eastern Regional Meeting, Lexington, Kentucky, 5 pages.

M. Handels et al., "Adjoint-Based Well-Placement Optimization Under Production Constraints, " Feb. 2007, SPE105797, SPE Reservoir Simulation Symposium, Houston, Texas, 7 pages.

Pallav Sarma et al., "Efficient Real-Time Reservoir Management Using Adjoint-Based Optimal control and Model Updating," 2006, Computational Geosciences, vol. 10, 34 pages.

D. R. Brouwer et al., "Improved Reservoir Management Through Optimal Control and Continuous Model Updating, " Sep. 2004, SPE90149, SPE Annual Technology Conference and Exhibition, Houston, Texas, 11 pages.

International Search Report and Written Opinion for International Application No. PCT/US2009/034689 dated Jul. 14, 2009, 12 pages.

Bangerth, W.; Klie, H.; Wheeler, M.; Stoffa, P.; Sen, M.; "On Optimization Algorithms for the Reservoir Oil Well Placement Problem," Computational Geosciences, vol. 10, pp. 303-319, Aug. 17, 2006.

Beckner, B. L.; Song, X.; "Field Development Planning Using Simulated Annealing—Optimal Economic Well Scheduling and Placement," In Proceedings 1995 SPE Annual Technical Conference & Exhibition, Dallas, Texas, SPE 30650, Oct. 22-25, 1995.

Handels, M.; Zandvliet, M.J.; Brouwer, D.R.; Jansen, J.D., "Adjoint-Based Well-Placement Optimization Under Production Constraints," In Proceedings 2007 SPE Reservoir Simulation Symposium, Houston, Texas, SPE 105797, Feb. 26-28, 2007.

Montes, G.; Bartolome, P.; Udias, A. L.; "The Use of Genetic Algorithms in Well Placement Optimization," , In Proceedings 2001 SPE Latin American and Caribbean Petroleum Engineering Conference, Buenos Aires, Argentina, SPE 69439, Mar. 25-28, 2001.

Wang, C.; Li, G.; Reynolds, A.C.; "Optimal Well Placement for Production Optimization," In Proceedings 2007 SPE Eastern Regional Meeting, Lexington, Kentucky, Oct. 11-14, 2007.

* cited by examiner

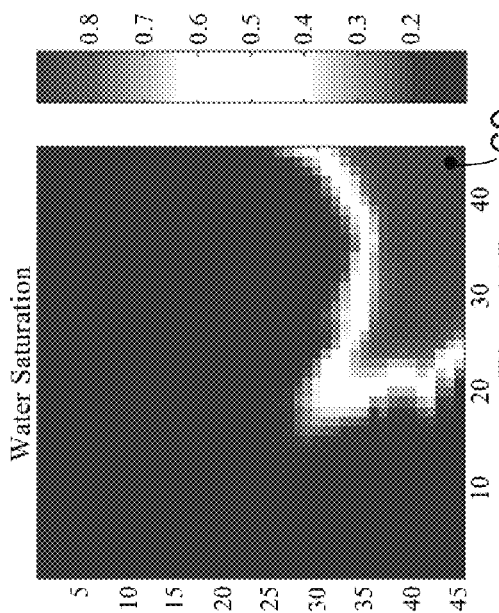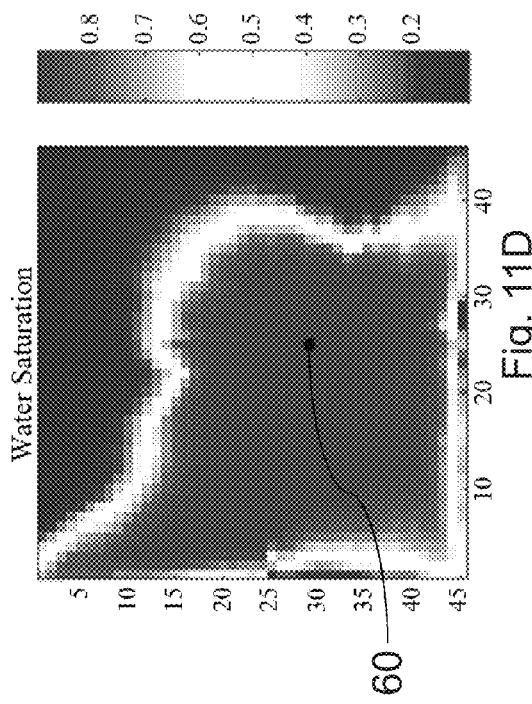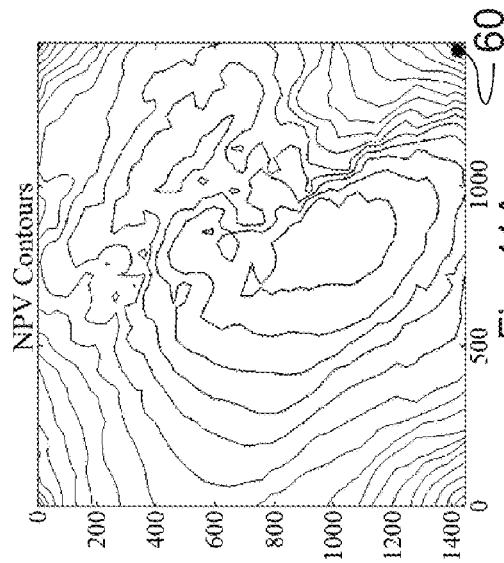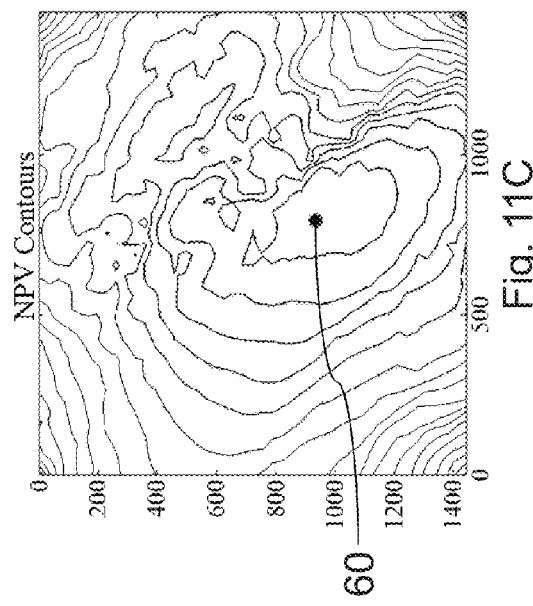

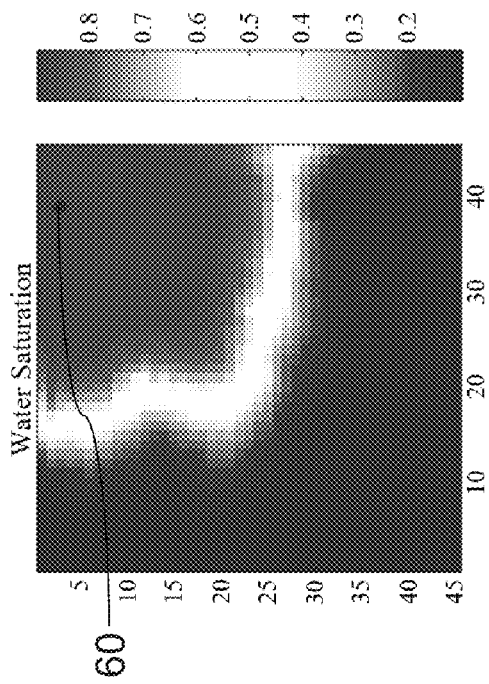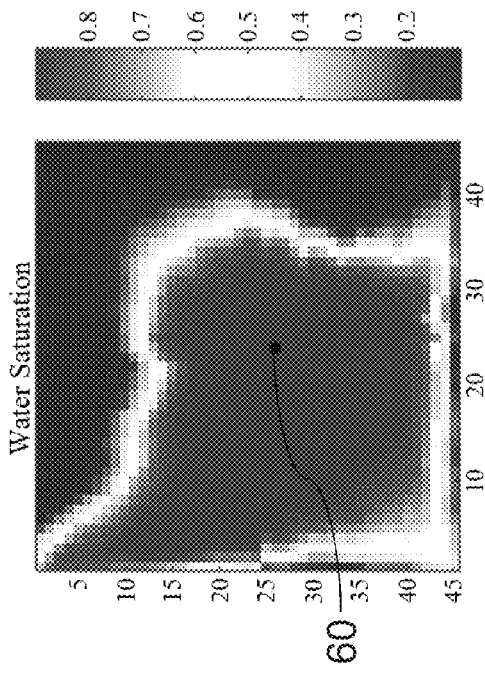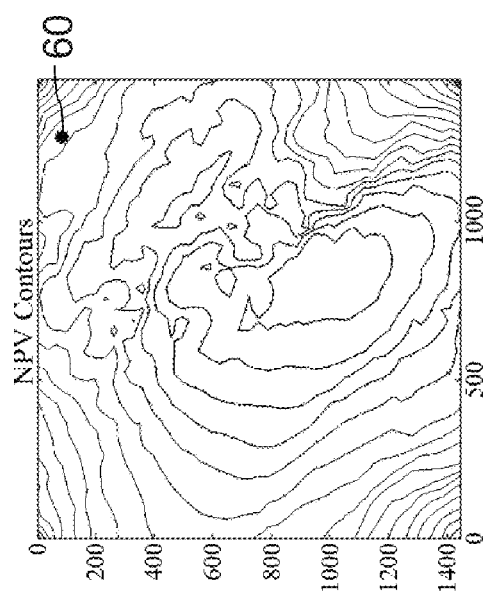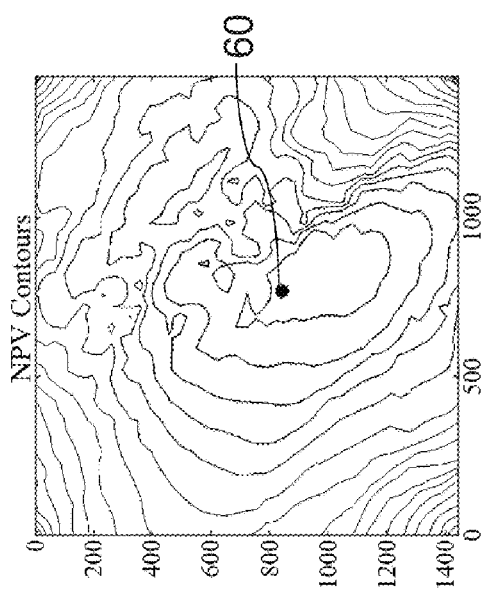
Fig. 12A
Fig. 12B
Fig. 12C
Fig. 12D

SYSTEM AND METHOD FOR EFFICIENT WELL PLACEMENT OPTIMIZATION

RELATED APPLICATIONS

The present application for patent claims priority to provisional patent application U.S. Ser. No. 61/030,370, filed Feb. 21, 2008, which is hereby incorporated herein by reference in its entirety.

FIELD OF THE INVENTION

The present invention relates in general to a method of efficient well placement optimization to maximize asset value within reservoir management, and in particular to a method which utilizes gradient-based techniques and associated adjoint models to optimize well placement in an oilfield.

BACKGROUND OF THE INVENTION

The determination of optimal well locations to maximize asset value throughout the life of an oilfield is a key reservoir management decision. Current industry practice is to determine the location of wells through manual approaches, wherein one must rely on engineering judgment and numerical simulation. Although this may be viable for small reservoirs with a small number of wells, the use of such approaches becomes increasingly cumbersome and very undesirable when dealing with large reservoirs and a large number of wells. In some instances, the use of such manual methodology is not feasible for such large-scale simulation models.

There has been an increasing interest in solving the problem of well optimization more efficiently with the use of automatic optimization algorithms. Optimal well placement is typically formulated as a discrete parameter optimization problem, because the well location variables (i, j indices of grid blocks where wells are located) are discrete variables. Due to the discrete nature of this problem, gradients of the objective function (e.g., Net Present Value (NPV)) with respect to these discrete variables do not exist. Therefore, the majority of existing algorithms applied to this problem have been stochastic gradient-free algorithms, such as genetic algorithms, simulated annealing, and stochastic perturbation methods. Although these algorithms are generally easy to apply and are supposedly global in nature, they are usually quite inefficient requiring hundreds of simulations. Thus, these methods have limited application to large-scale simulation models with many wells. Furthermore, they do not guarantee a monotonic increase in the objective function with successive iterations, which implies that increasing the computational effort may not necessarily provide a better optimum.

Efficiency of the optimization algorithm becomes imperative for practical applicability, as most practical simulation models range from a few hundred thousand cells to a few million cells. With hundreds of wells, simulation of these models typically require many hours for a single evaluation. Furthermore, since any improvement of the objective function from the base case is useful, it is desirable, although not necessary, to obtain the global optimum. Therefore, gradient-based algorithms seem to be a practical choice provided that they can be applied to this problem. Gradient-based algorithms with associated adjoint models are typically considered more efficient compared to the foregoing stochastic algorithms, as they generally require only tens of iterations for convergence and guarantee a monotonically increasing objective function with successive iterations. Gradient-based algorithms do however have the potential drawback of being stuck in local minima. Additionally, due to the nature of being a discrete parameter problem, gradients of the objective function with respect to these discrete variables do not exist and therefore, a direct application is not possible for the discrete parameter problem. Methods of applying gradients and adjoints have, none the less, been used indirectly for the well placement problem.

One example is a method that surrounds each well to be optimized by eight "pseudo-wells" in the eight neighboring grid blocks in the 2D plane. Each pseudo-well produces at a very low rate to minimize their respective influence on the flow behavior of the reservoir. An adjoint model is then used to calculate the gradient of the objective function, such as Net Present Value, over the life of the reservoir with respect to the rate at each pseudo-well. The largest positive gradient value among the eight gradients then determines the direction in which the original well should be moved to increase the objective function in the next iteration. That is, the improving direction is approximated as the direction of the pseudo-well location, from the original well location, with the largest positive gradient.

This approach is an indirect application of gradients, as gradients of the objective function with respect to rate of the pseudo-well are used instead of the gradients of the objective function with respect to actual optimization parameters (i, j well location indices). Furthermore, a basic limitation of the approach is that only eight possible search directions for each well, which correspond to the direction of the eight pseudo-wells, can be obtained per iteration. This can be quite limiting as the optimal search direction resulting in the fastest increase in the objective function can be any arbitrary direction in the 2D plane. Also, each well is typically set to move only one grid block per iteration, which will be very inefficient for practical problems.

Another example of an indirect method of applying gradients and adjoints for the well placement problem, is a method that initializes the optimization problem with an injector well at each grid block that does not contain a producer well. The number of injector wells is successively reduced at each iteration until the optimal number of injector wells remain at the optimal locations. In order to do so, the objective function, such as a function to obtain Net Present Value, is augmented with a drilling cost assigned to each well drilled. Therefore, the modified objective function will be more heavily penalized for a larger number of drilled injector wells due to the associated total drilling cost. The algorithm advances by calculating the gradient of the modified objective function with respect to the rate of each injector well using an adjoint model. These gradients are used to calculate the next rate for each well injector using the steepest descent method. As the rate of an injector well goes to zero, the injector well is eliminated. Ultimately, the optimum number of injector wells at the optimal well locations should remain.

Again, this example is also an indirect application of gradients, as the gradients of the objective function with respect to rate of the injector wells is used instead of the gradients of the objective function with respect to actual optimization parameters (i, j well location indices). Further, because this algorithm starts by drilling an injector well at each grid block, and only one injector can be eliminated per iteration, it is clearly not a very practical or efficient approach for large-scale simulation problems.

SUMMARY OF THE INVENTION

According to an aspect of the present invention, a method is disclosed for optimizing well placement in a reservoir field.

The method includes providing a geological model of a reservoir field, a grid defining a plurality of cells, one or more wells to be located within the plurality of cells, and an objective function. The geological model is associated with the grid defining a plurality of cells. The locations of the wells are represented by continuous well location variables associated with a continuous spatial domain. A gradient of the objective function is calculated responsive to the continuous well location variables. The locations of the wells are then adjusted responsive to the calculated gradient of the objective function. Iterative calculation of the gradient and adjustment of the well continue until the well location is optimized.

In some embodiments, a visual representation of the reservoir field can be generated. The visual representation can illustrate the well in the optimized location, a saturation map, a net present value amount, or a combination thereof.

In some embodiments, a source/sink or well term that has a non-zero magnitude in each of the plurality of cells is used to calculate the gradient of the objective function.

In some embodiments, a governing partial differential equation that includes a continuous approximation for a source/sink or well term is used to calculate the gradient of the objective function.

In some embodiments, numerical perturbation or adjoint models are utilized for calculating the gradient of the objective function.

In some embodiments, a pseudo-well is added to each cell in which the magnitude of the source/sink or well term is greater than a predetermined amount. The magnitude of the source/sink or well term for each cell is based on the cells distance to the location of the well.

Another aspect of the present invention includes a system to optimize well placement in a reservoir field. The system includes a computer processor and a software program executable on the computer processor. The software program includes a well location assigner module, a gradient calculator module, and a well placement module. The well location assigner module associates the location of a well with a continuous spatial domain such that the location of the well is represented by continuous well location variables. The gradient calculator module calculates the gradient of an objective function responsive to the continuous well location variables. The well placement module adjusts the location of the well responsive to the gradient of the objective function until the well is in an optimized location. The system also includes a user database to store system information. A geological model of a reservoir field, a grid defining a plurality of cells, production or injection wells, and objective functions are all examples of system information. The system can additionally display a visual representation of the reservoir field responsive to the optimized location of the well.

Another aspect of the present invention includes a software program stored on a processor readable medium used for optimizing the well placement in a reservoir field. Software includes a well location assigner module, a gradient calculator module, and a well placement module. The well location assigner module associates the location of a well with a continuous spatial domain such that the location of the well is represented by continuous well location variables. The gradient calculator module calculates the gradient of an objective function responsive to the continuous well location variables. The well placement module adjusts the location of the well responsive to the gradient of the objective function until the well is in an optimized location within the reservoir field.

BRIEF DESCRIPTION OF THE DRAWINGS

FIG. 11A is a representation depicting an initial well location plotted on the contours shown in FIG. 9, in accordance with the present invention.

FIG. 11B is a final water saturation map for the injector well shown in FIG. 11A, in accordance with the present invention.

FIG. 11C is a representation depicting an optimized well location starting from the well location shown in FIG. 11A plotted on the contours shown in FIG. 9, in accordance with the present invention.

FIG. 11D is a final water saturation map for the injector well shown in FIG. 11C, in accordance with the present invention.

FIG. 12A is a representation depicting an initial well location plotted on the contours shown in FIG. 9, in accordance with the present invention.

FIG. 12B is a final water saturation map for the injector well shown in FIG. 12A, in accordance with the present invention.

FIG. 12C is a representation depicting an optimized well location starting from the well location shown in FIG. 12A plotted on the contours shown in FIG. 9, in accordance with the present invention.

FIG. 12D is a final water saturation map for the injector well shown in FIG. 12C, in accordance with the present invention.

DETAILED DESCRIPTION OF THE INVENTION

Definitions

Certain abbreviations, characters, and general nomenclature are defined throughout the foregoing description as they are first used, while others are defined below:
NLP Nonlinear programming
NPV Net present value
PDE Partial differential equations
$C_{w,p}$ Water production costs per Bbl
$C_{w,i}$ Water injection costs per Bbl
f Weight function of geometric well index
g Dynamic system equations
J Objective function
k Permeability
L Lagrangian
$\tilde{m}^w$ Source/sink or well term
$m^w$ Source/sink term strength or well term in mass balance equations
N Number of control steps
$N_g$ Number of grid blocks
$N_P$ Number of producers
$N_I$ Number of injectors
p Grid block pressure
$p^W$ Well BHP
$P_{o,p}$ Oil price per Bbl
t Time
u Control vector
W Well terms of simulation equations
WI Geometric well index
x Spatial variable
x Dynamic states
X Component mass fraction
y Spatial variable
α Discounting factor
δ Dirac delta function
φ Porosity
Φ Nonlinear mapping to feature space
λ Mobility
λ Lagrange multipliers
ρ Fluid density
σ Standard deviation
ω Grid block where well is located
ν Arbitrary grid block
Ω Simulation grid spatial domain Subscript Characters
c Component
i Summation index, grid block index
j Summation index, grid block index
k Summation index
o Oil
p Phase
w Water
SC Standard conditions
ω Grid block where well is located
Superscript Characters
n Time level
W Well Embodiments of the present invention described herein are generally directed to a direct, efficient, and rigorous method for optimizing well placement in a reservoir field. As will be discussed herein, this method is applicable to large-scale simulation models through use of gradient-based techniques and associated adjoint models.

Figure 1:
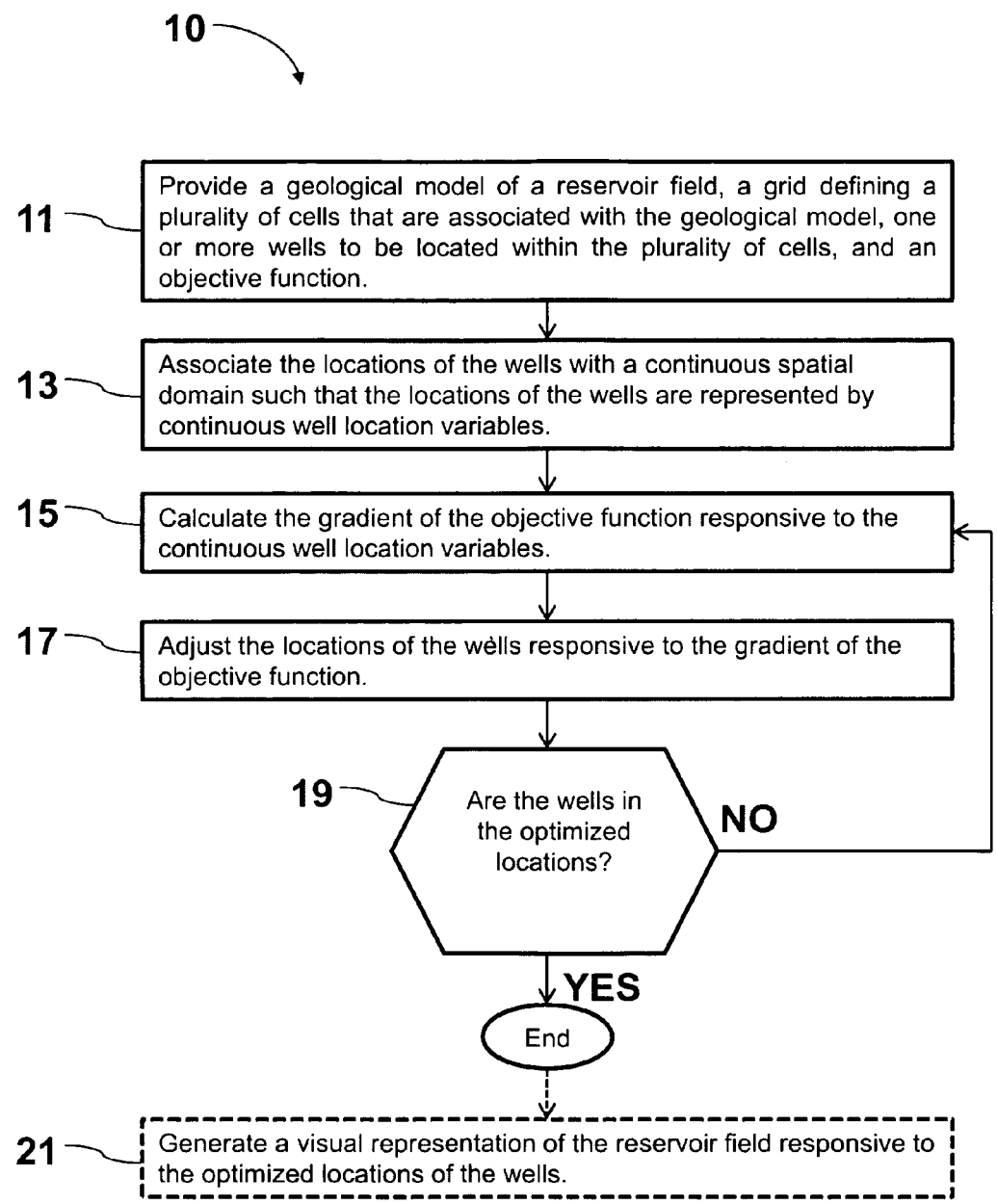
FIG. 1 is a flowchart illustrating steps of a well placement optimization method, in accordance with the present invention.

FIG. 1 illustrates the steps of method 10 for optimizing well placement in a reservoir field. In step 11, a geological model of a reservoir field, a grid defining a plurality of cells that are associated with the geological model, one or more wells to be located within the plurality of cells, and an objective function are provided. In step 13, the locations of the wells are represented by continuous well location variables associated with a continuous spatial domain. In step 15, a gradient of the objective function is calculated responsive to the continuous well location variables. The locations of the wells are then adjusted responsive to the calculated gradient of the objective function in step 17. In step 19, it is determined whether the locations of the wells have been optimized. If the locations of the wells have not been optimized, steps 15 and 17 are repeated until the well locations are optimized. In some instances and as illustrated in step 21, once the locations of the wells have been optimized a visual representation of the reservoir field can be generated based on the optimized locations of the wells.

The geological model of the reservoir field is used to simulate the behavior of the fluids within the reservoir under different sets of circumstances to find optimal production techniques. Typically these models comprise a structural and stratigraphic framework populated with rock properties such as permeability distributions and porosity distributions, as well as, fluid properties such as fluid saturation distributions. The grid decomposes the geological model into a plurality of smaller and simpler counterparts, which are referred to as cells. Therefore, the grid breaks the continuous domain of the reservoir model into discrete counterparts that can subsequently be used to construct a simulation model by discretizing the equations describing fluid flow associated with each cell. The reservoir model can be gridded with various cell sizes and shapes depending on the gridding strategy.

The placement of injection and production wells within the simulation model can greatly impact the amount of ultimate hydrocarbon recovery. For example, in situations in which a fracture provides for direct connectivity between a production well and a fluid injection well, the injected fluids can flow through the fracture and bypass the majority of hydrocarbons within the formation that the injected fluids were supposed to help produce. The method optimizes well placement by defining a continuous approximation to the original discrete-parameter well placement problem. Gradients can be calculated using the continuous approximation, such that gradient-based optimization algorithms can be employed for efficiently determining the optimal well locations. In particular, the discrete well location parameters, i, j indices of grid blocks or cells, are replaced with their continuous counterparts in the spatial domain, x, y well locations.

A continuous functional relationship between the objective function and the continuous parameters is obtained by replacing, in the underlying governing partial differential equations (PDE's), the discontinuous Dirac-delta functions that define wells as point sources with continuous functions. The continuous functions preferably in the limit tend to the Dirac-delta function, such as the bivariate Gaussian function. Numerical discretization of the modified partial differential equations leads to well terms in the mass balance equations that are continuous functions of the continuous well location variables. An implication of the continuous approximation is that in the numerical model, the original wells are now surrounded by pseudo-wells whose geometric well indices are weighted by spatial integrals of the continuous function, which itself is a function of the x and y locations of the original wells. With this continuous functional relationship, adjoints and gradient-based optimizations algorithms may be applied to obtain the optimal well locations.

Therefore, advantages over the previous well optimization methods are that the actual gradient with respect to the well location variables are obtained and any arbitrary search direction is possible at each iteration. The efficiency and practical applicability of this approach is demonstrated on a few synthetic waterflood optimization problems later herein.

Discrete Parameter Problem Definition

The well placement optimization problem can be described as finding the location of wells (i and j indices of grid blocks where wells are to be located), represented by control vector u, to maximize (or minimize) a performance measure J(u). The optimization can be described generally with the following mathematical formulation:

$$\max_u \left[ J = \sum_{n=0}^{N-1} L^n(x^{n+1}, u) \right] \quad \text{(Equation 1)}$$

subject to:

$g^n(x^{n+1}, x^n, u) = 0 \quad \forall n \in (0, \ldots, N-1)$ $x^0 = x_0 \quad$ (Initial Condition)

$u \in \Omega$

Here $x^n$ refers to the dynamic states including, but not limited to pressures, saturations, and compositions of the simulation model $g^n$ representing the reservoir at time step n. N is the total number of time steps. The simulation model $g^n$, together with the initial conditions, define the dynamic system, which are basically the reservoir simulation equations for each grid block at each time step:

$$g^n(x^{n+1}, x^n, u) = \text{Accumulation} - \text{Flux} - \text{Well} \quad \text{(Equation 2)}$$

As described herein, the objective function J is directed to maximizing the Net Present Value (NPV), however other objective functions could be used. For example, the objective function could be directed at maximizing one of ultimate hydrocarbon recovery or reservoir percentage yield. The objective function is defined as a summation over all time steps as of a function of $L^n$, which is well known in the art as the Lagrangian. Since $L^n$ usually consists of well parameters or quantities that are functions of well parameters, it is written below in a fully implicit form. Therefore, the definition of $L^n$ as used herein shall be defined as follows:

$$L^n(x^{n+1}, u) = \sum_{j=1}^{N_P} \left[ \frac{P_{op}}{\rho_{o,SC}} W_{op,j}^n - \frac{C_{wp}}{\rho_{w,SC}} W_{wp,j}^n \right] \frac{\Delta t^n}{(1+\alpha)^n} - \quad \text{(Equation 3)}$$

$$\sum_{j=1}^{N_I} \frac{C_{wi}}{\rho_{w,SC}} W_{wi,j}^n \frac{\Delta t^n}{(1+\alpha)^n}$$

The last constraint of Equation 1, where $\Omega$ represents the spatial domain encompassed by the reservoir simulation model, simply states that the wells have to be located within the simulation model. For example, this constraint could be simple bound constraints for rectangular simulation models or could be nonlinear functions of the spatial variables if the model boundaries are curvilinear. However, this constraint is usually not a function of the dynamic states, $x^n$, and are therefore, easy to handle with standard nonlinear programming algorithms (NLP's).

Since the control vector, u, consists of the i and j indices of the grid blocks where the wells to be optimized are located and these indices are discrete in nature, a gradient of the objective function J with respect to u does not exist. Therefore, gradient-based optimization algorithms cannot be applied to solve this optimization problem directly. Thus, in order to apply gradient-based optimization algorithms on this problem, a continuous approximation of the original problem needs to be formulated.

Continuous Approximation

Figure 2:
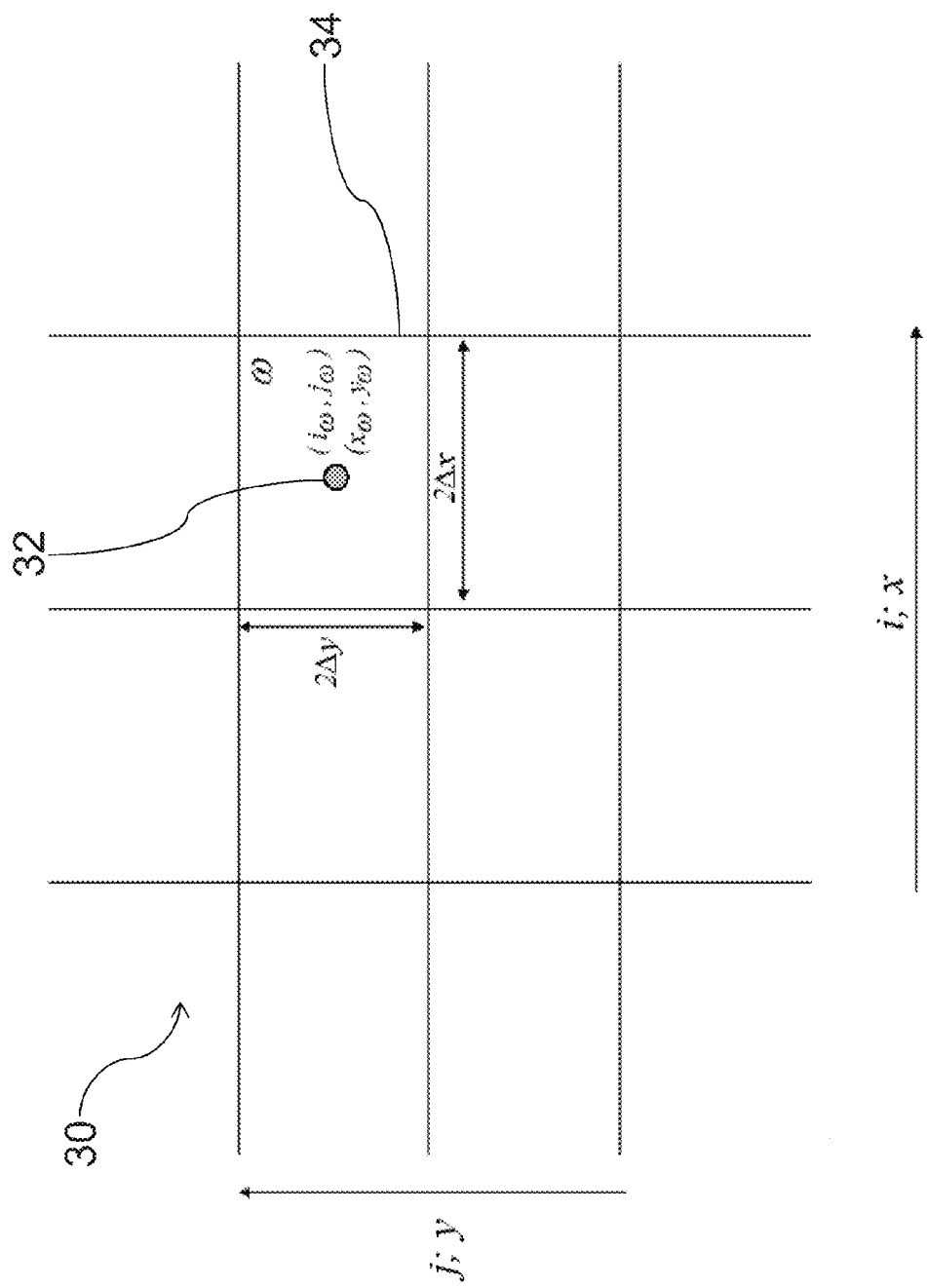
FIG. 2 is a schematic of a uniform rectangular grid with a well located in grid block ω, in accordance with the present invention.

FIG. 2 shows a schematic of a numerical grid 30 associated with a well 32. In FIG. 2, i represents the grid indices in the x spatial direction and j represents the grid indices in the y spatial direction. Well 32 is present in grid block 34, also labeled ω, with grid block indices $(i_\omega, j_\omega)$ and spatial location $(x_\omega, y_\omega)$. The grid 30 as shown is a uniform rectangular grid with dimensions $2\Delta x$ and $2\Delta y$.

A continuous approximation to this discrete parameter problem can be obtained by first replacing the original discrete control parameters with their continuous counterparts of the underlying spatial domain. Therefore, the ij locations of wells are replaced with the spatial locations of the wells in the continuous xy domain, which are continuous variables. However, this alone does not solve the problem because the spatial location variables of the wells ($x_\omega$ and $y_\omega$) do not directly appear in the dynamic system (mass balance equations $g^n$) that provide the functional relationship between the location of the well, which is the control parameter, and the objective function (NPV). Therefore a continuous functional relationship between the continuous well location variables ($x_\omega$ and $y_\omega$) and the objective function J must be defined. The gradient of the objective function with respect to $x_\omega$ and $y_\omega$ can then be obtained and the application of a gradient-based optimization algorithm can be used to obtain the optimal well locations.

Since it is not possible to replace the discrete grid with any continuous approximation in terms of the underlying spatial variables, it is necessary to look at other aspects of the problem in order to determine how one can introduce functional dependence of the mass balance equations $g^n$ on the well locations variables $x_\omega$ and $y_\omega$. According to the present method, the original continuous governing equations (PDE's) are considered, for which the discrete simulation equations are an approximation. Note that the methodology herein is independent of the number of phases or components of the simulation model, and therefore for simplicity, the single phase governing equations shall be considered:

$$\nabla \cdot \left(\frac{\rho}{\mu} k \nabla p\right) - \tilde{m}^w = \frac{\partial}{\partial t}(\phi \rho) \quad \text{(Equation 4)}$$

A term of interest, with respect to the method of the present invention, is the source/sink or well term $\tilde{m}^w$ representing the addition or removal of fluids from the dynamic system. For two dimensional systems, source/sink or well terms are usually point sources/sinks, and therefore, the source/sink term for a point source/sink at $(x_\omega, y_\omega)$ can be defined as:

$$\tilde{m}^w = m^w \delta^2(x - x_\omega, y - y_\omega) \quad \text{(Equation 5)}$$

Here, $\tilde{m}^w$ is the usual well term that appears in the simulation equations (strength of the source/sink, with units mass/time), and $\delta^2$ is the two dimensional Dirac-delta function defined as:

$$\delta^2(x - x_\omega, y - y_\omega) = \delta(x - x_\omega)\delta(y - y_\omega) \quad \text{(Equation 6)}$$
$$= \begin{cases} \infty & x = x_\omega, y = y_\omega \\ 0 & \text{otherwise} \end{cases}$$

Numerical discretization of Equation 4 would result in integration of Equation 5 over the domain of the reservoir $\Omega$. The final well terms in the discretized mass balance equations, resulting from the presence of the point source/sink at $(x_\omega, y_\omega)$ for any arbitrary grid block $v$, is given as:

$$\int\!\!\int_{\Omega_v} m^w \delta^2(x - x_\omega, y - y_\omega) = \begin{cases} m^w & v = \omega \\ 0 & \text{otherwise} \end{cases} \quad \text{(Equation 7)}$$

Here, $\Omega_v$ is the part of the reservoir domain $\Omega$ in grid block $v$. It is clear from Equation 7 that the well term $m^w$ will only appear in the mass balance equations of grid block $\omega$ as required.

Instead of looking at a continuous approximation to the grid, in the method a continuous approximation to this discontinuous Dirac-delta function is proposed. Essentially, it is preferable to have a continuous approximation to the discontinuous Dirac-delta function. In other words, it is preferable that the continuous function in the limit tends to the Dirac-delta function. One such function is the bivariate Gaussian function, because:

$$\lim_{\sigma \to 0} \frac{1}{2\pi\sigma^2} \exp\left[-\frac{1}{2\sigma^2}\left\{\begin{matrix}(x-x_\omega)^2 + \\ (y-y_\omega)^2\end{matrix}\right\}\right] = \delta^2\begin{pmatrix}x - x_\omega, \\ y - y_\omega\end{pmatrix} \quad \text{(Equation 8)}$$

Furthermore, both are probability densities, because:

$$\int_{-\infty}^{+\infty}\!\!\int_{-\infty}^{+\infty} \frac{1}{2\pi\sigma^2} \exp\left[-\frac{1}{2\sigma^2}\left\{\begin{matrix}(x-x_\omega)^2 + \\ (y-y_\omega)^2\end{matrix}\right\}\right] dx\,dy = \quad \text{(Equation 9)}$$
$$\int_{-\infty}^{+\infty}\!\!\int_{-\infty}^{+\infty} \delta^2\begin{pmatrix}x - x_\omega, \\ y - y_\omega\end{pmatrix} dx\,dy = 1$$

Figure 3:
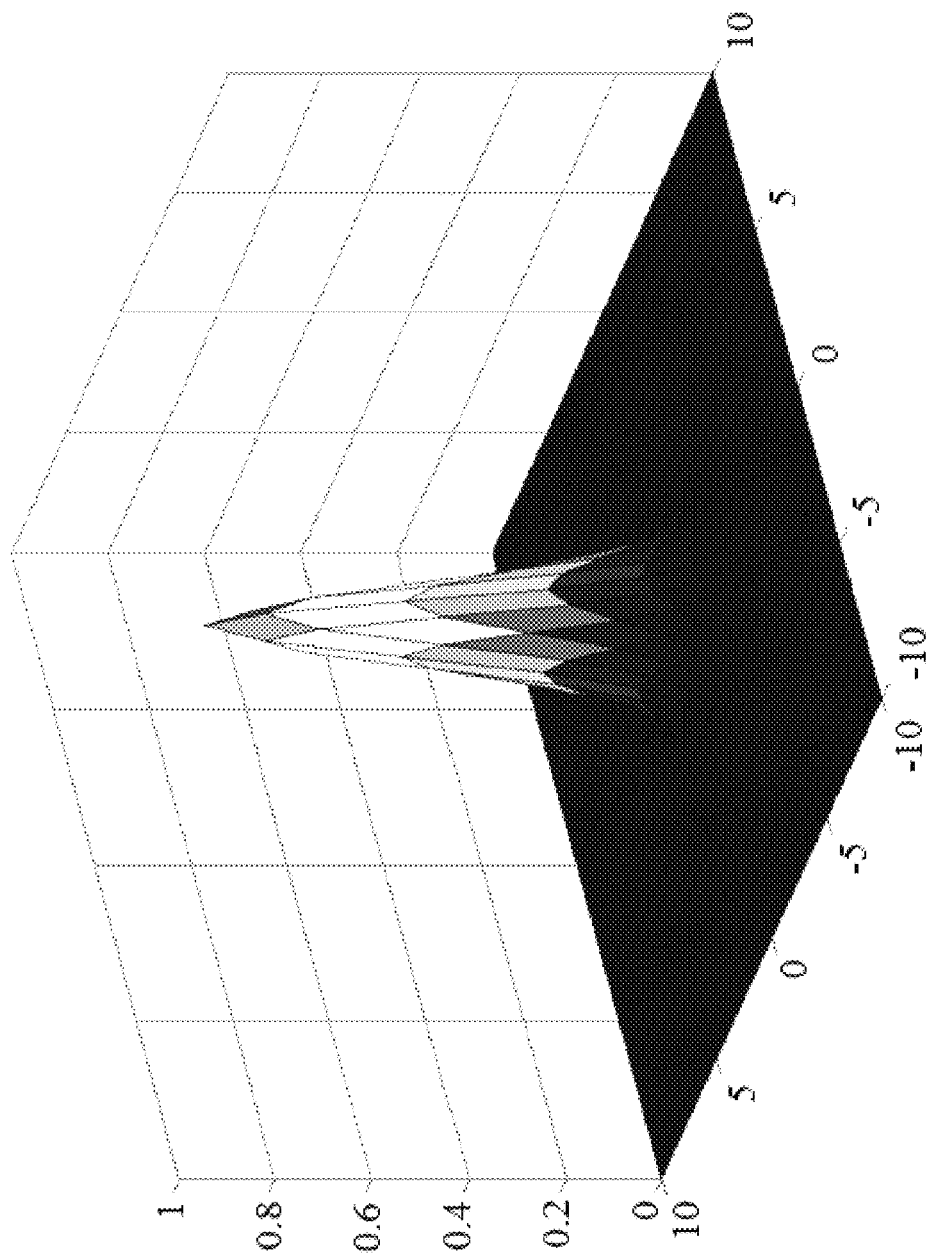
FIG. 3 is a representation of the bivariate Gaussian function, in accordance with the present invention.

FIG. 3 shows the bivariate Gaussian function. As the standard deviation, $\sigma$, is reduced, the function becomes more and more steep and ultimately tends towards the Dirac-delta function.

Replacing the Dirac-delta function with the bivariate Gaussian function in the governing equations (PDE's) and then discretizing, results in a modification to the well terms in the mass balance equations. These terms are approximations to the original well terms given by Equation 7. The new well term for any arbitrary grid block $v$ associated with the well in grid block $\omega$ is given as:

$$\int\!\!\int_{\Omega_v} m^w \frac{1}{2\pi\sigma^2} \exp\left[-\frac{1}{2\sigma^2}\left\{\begin{matrix}(x-x_\omega)^2 + \\ (y-y_\omega)^2\end{matrix}\right\}\right] dx\,dy \quad \text{(Equation 10)}$$

Here, $\Omega_v$ is the part of the domain of the reservoir in grid block $v$. As will be readily appreciated by those skilled in the art, the result of this approximation is that the new well term, as given by Equation 10, is non-zero in every grid block and is a continuous function of the well location variables $(x_\omega, y_\omega)$. As a comparison, the well term, as given by Equation 7, is non-zero only in grid block $\omega$. The mass balance equations $g^n$ are now a function these variables $(x_\omega, y_\omega)$. Therefore, a functional relationship between these variables and the objective function, J, for maximizing the Net Present Value is obtained. In essence, $m^w$ is distributed over the entire reservoir and the magnitude of the well term for an arbitrary grid block $v$ depends on the distance of the grid block $v$ from grid block $\omega$, as well as, its size and shape.

The fact that the application of the above approximation results in a well term that is non-zero in every grid block implies that a well has to be created in every grid block, which is not practically feasible. This can be eliminated considering that the larger the distance of an arbitrary grid block from grid block $\omega$, the smaller the magnitude of the well term. By making the standard deviation, $\sigma$, small enough, but not zero, the well terms except for the grid blocks nearest to grid block $\omega$ can be made very small and thus discarded. Further, a small standard deviation, $\sigma$, implies that the Gaussian approximation is very close to the Dirac-delta function, and therefore, the modified continuous problem is a close approximation to the original discrete problem.

Figure 4:
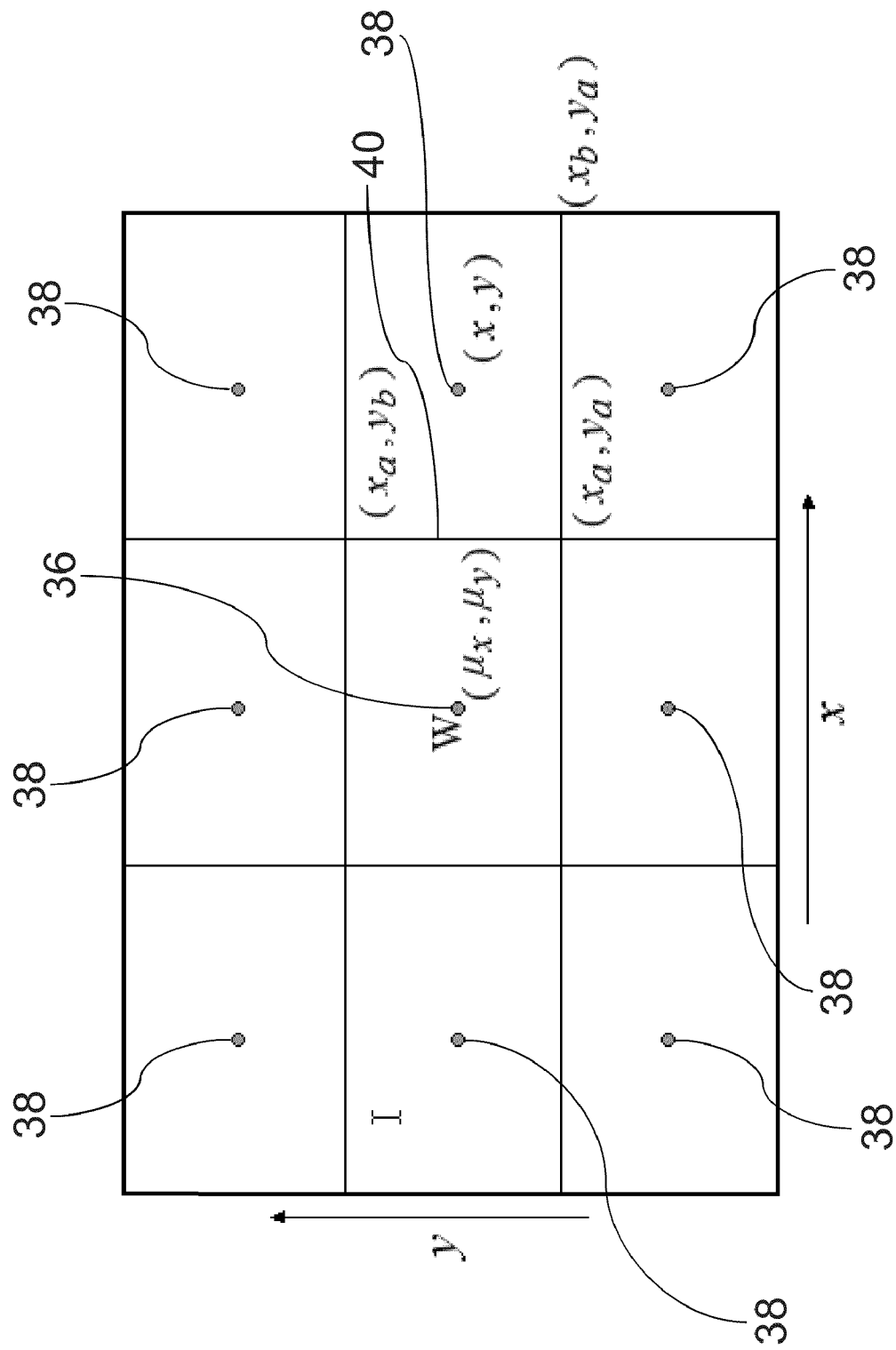
FIG. 4 is a schematic depicting a well surrounded by pseudo-wells in neighboring grid cells, in accordance with the present invention.

FIG. 4 illustrates the result of the application of the method generally described above. A well 36, also labeled W, is now surrounded by a set of "pseudo-wells" 38. Well 36 is positioned within cell 40 and pseudo-wells 38 are in the neighboring grid cells. Pseudo-wells 38 are defined using Equation 10. From an implementation perspective, pseudo-wells 38 and well 36 have the same geometric well indices as original well 32 shown in FIG. 2, but are weighted with the integral of the bivariate Gaussian function as in Equation 10. As explained above herein, the weights for each pseudo-well 38 and well 36 are dependent upon its distance from original well 32 and the size and shape of the grid in which it is located. That is, the well term for these wells for a general multiphase, multi-component simulation model is given as:

$$f(x_\omega, y_\omega, \sigma) W I^\omega \sum_p \lambda_p \rho_p X_{cp}(p_p - p^W) \quad \text{(Equation 11)}$$

Every term in the above equation is standard notation except the function $f$, which is the weight determined from the integral of the Gaussian function. Given again for clarity:

$$f(x_\omega, y_\omega, \sigma) = \int\int_{\Omega_\upsilon} \frac{1}{2\pi\sigma^2} \exp\left[-\frac{1}{2\sigma^2}\left\{\begin{array}{c}(x-x_\omega)^2 + \\ (y-y_\omega)^2\end{array}\right\}\right] dx\,dy \quad \text{(Equation 12)}$$

To elaborate and clarify further, consider the uniform rectangular grid given in FIG. 2. The weight function $f$ for a grid block $v$ centered at $(x_v, y_v)$ is given as:

$$f(x_\omega, y_\omega, \sigma) = \quad \text{(Equation 13)}$$
$$\int_{x_\upsilon-\Delta x}^{x_\upsilon+\Delta x}\int_{y_\upsilon-\Delta y}^{y_\upsilon+\Delta y}\frac{1}{2\pi\sigma^2}\exp\left[-\frac{1}{2\sigma^2}\left\{\begin{array}{c}(x-x_\omega)^2+\\(y-y_\omega)^2\end{array}\right\}\right]dx\,dy$$

This double integral can be evaluated analytically, and is given as:

$$f(x_\omega, y_\omega, \sigma) = \frac{1}{4}\left\{\mathrm{erf}\left(\frac{x_\upsilon+\Delta x-x_\omega}{\sqrt{2}\,\sigma}\right) - \mathrm{erf}\left(\frac{x_\upsilon-\Delta x-x_\omega}{\sqrt{2}\,\sigma}\right)\right\} \quad \text{(Equation 14)}$$
$$\left\{\mathrm{erf}\left(\frac{y_\upsilon+\Delta y-y_\omega}{\sqrt{2}\,\sigma}\right) - \mathrm{erf}\left(\frac{y_\upsilon-\Delta y-y_\omega}{\sqrt{2}\,\sigma}\right)\right\}$$

Here erf is the error function. However, for arbitrary shaped grid blocks (non-uniform shaped grids), it may not be possible to obtain this integral analytically. In such a case, numerical integration may be applied.

The final modification of the original problem to complete the continuous approximation is to modify the original objective function to also include pseudo-wells 38 associated with each well 36 to be optimized. This can be expressed by:

$$L^n(x^{n+1}, u) = \quad \text{(Equation 15)}$$
$$\sum_{j=1}^{N_P}\left[\begin{array}{c}\frac{P_{op}}{\rho_{o,SC}}\left\{W_{op,j}^n + \sum_{k=1}^{8}W_{op,jk}^n\right\} - \\ \frac{C_{wp}}{\rho_{w,SC}}\left\{W_{wp,j}^n + \sum_{k=1}^{8}W_{wp,jk}^n\right\}\end{array}\right]\frac{\Delta t^n}{(1+\alpha)^{t^n}} -$$
$$\sum_{j=1}^{N_I}\frac{C_{wi}}{\rho_{w,SC}}\left\{W_{wi,j}^n + \sum_{k=1}^{8}W_{wi,jk}^n\right\}\frac{\Delta t^n}{(1+\alpha)^{t^n}}$$

In Equation 15, it is assumed that all the $N_P$ producers and $N_I$ injectors in the simulation model are to be optimized. One skilled in the art will recognize that it is trivial to exclude certain wells from being optimized by not creating any pseudo-wells for such wells. Additionally, in Equation 15 the control vector u now refers to the continuous well location variables $(x_\omega, y_\omega)$ and not the discrete grid block indices $(i,j)$ as in the original problem.

The essence of Equation 12 and Equation 13 or Equation 14 is that the well terms, of all pseudo-wells 38 and well 36, in the mass balance equations $g^n$ are continuous functions of the continuous well location variables $(x_\omega, y_\omega)$ of the original well 32. Accordingly, a continuous functional relationship between these variables and the objective function J for maximizing Net Present Value is obtained. Therefore, the gradient of the objective function with respect to these variables can now be calculated either with numerical perturbation or with adjoints. These gradients are an approximation to the gradients obtained from the underlying partial differential equation on the continuous spatial domain of which the numerical model is an approximation. Note that the actual gradients of objective function J with respect to the well location variables $(x_\omega, y_\omega)$ are obtained. Therefore, any arbitrary search direction is possible at each iteration. Further, the step size is not limited to one grid block, but is determined using a line search procedure as in any standard gradient-based optimization algorithm known in the art.

By controlling the standard deviation, $\sigma$, the operator can control the degree of approximation to the original problem. Preferably standard deviation, $\sigma$, should be such that the weights of pseudo-wells 38 are very small compared to the weight of well 36, so that the approximation is very small. Also, although FIG. 3 shows one ring of pseudo-wells 38 around well 36, the approach is not limited to one ring. The possible benefit of having more than one ring is that, although as the number of rings of pseudo-wells 38 is increased, as well as the standard deviation being increased, the model becomes more and more approximate and therefore, the gradient direction obtained is more approximate. Having more rings implies that one is looking at a larger region around well 36 to calculate the descent direction and the search direction obtained should be a better direction in a global sense.

Gradient Calculation with Adjoints

Adjoint models have been widely employed for calculating gradients for the optimal well control problem. In other words, adjoint models are useful for determining the optimal production and injection rates or bottom hole pressures of wells to maximize an objective such as Net Present Value. From an implementation perspective, the optimal well control adjoint can be used with minor modifications to calculate the gradient for the well placement problem. The adjoint equations essentially remain the same as in the optimal control problem, and are given as:

$$\lambda^{Tn} = -\left[\frac{\partial L^{n-1}}{\partial x^n} + \lambda^{T(n+1)}\frac{\partial g^{n-1}}{\partial x^n}\right]\left[\frac{\partial g^{n-1}}{\partial x^n}\right]^{-1} \quad \forall n=1,\ldots,N-1 \quad \text{(Equation 16)}$$

$$\lambda^{TN} = -\left[\frac{\partial L^{N-1}}{\partial x^N}\right]\left[\frac{\partial g^{N-1}}{\partial x^N}\right]^{-1} \quad \text{(Final Condition)}$$

Because the weighting function $f(x_\omega, y_\omega, \sigma)$ of Equation 12 is not a function of the state variables $x^n$, only minor modifications to the $\partial L^{n-1}/\partial x^n$ code is required to take the pseudo-wells into account such that it is consistent with Equation 15. The remaining terms in Equation 16 are virtually unchanged.

Once the Lagrange multipliers $\lambda^n$ are calculated using Equation 16, the final gradient of objective function J with respect to the well location variables $(x_\omega, y_\omega)$ is calculated as:

$$\frac{dJ}{du} = \sum_{n=0}^{N-1}\left[\frac{\partial L^n}{\partial u} + \lambda^{T(n+1)}\frac{\partial g^n}{\partial u}\right] \quad \text{(Equation 17)}$$

Since both $L^n$ and $g^n$ are functionally dependent on u $(x_\omega, y_\omega)$ only through the well terms, which are given in Equation 11 and depend on u only through $f(x_\omega, y_\omega, \sigma)$, the calculation of the partial derivatives in Equation 17 require $\partial f/\partial x_\omega$ and $\partial f/\partial y_\omega$, which can be calculated analytically for Equation 14 or calculated numerically for more complicated cases. It should be understood that the derivatives $\partial f/\partial x_\omega$ and $\partial f/\partial y_\omega$ are preferably calculated externally to the simulator. The essence of this discourse, is that if a control adjoint is available and is implemented then all modifications necessary to implement the well placement adjoint are external to the forward simulator and can thus be accomplished relatively easily.

Therefore, this new more efficient application of gradient-based algorithms and associated adjoints to solve the well placement problem is extremely useful. It allows for very efficient calculation of the gradients of the objective function with respect to the well location variables (optimization parameters). Such gradients can then be used with standard gradient-based optimization algorithms to obtain the optimum very efficiently.

Figure 5:
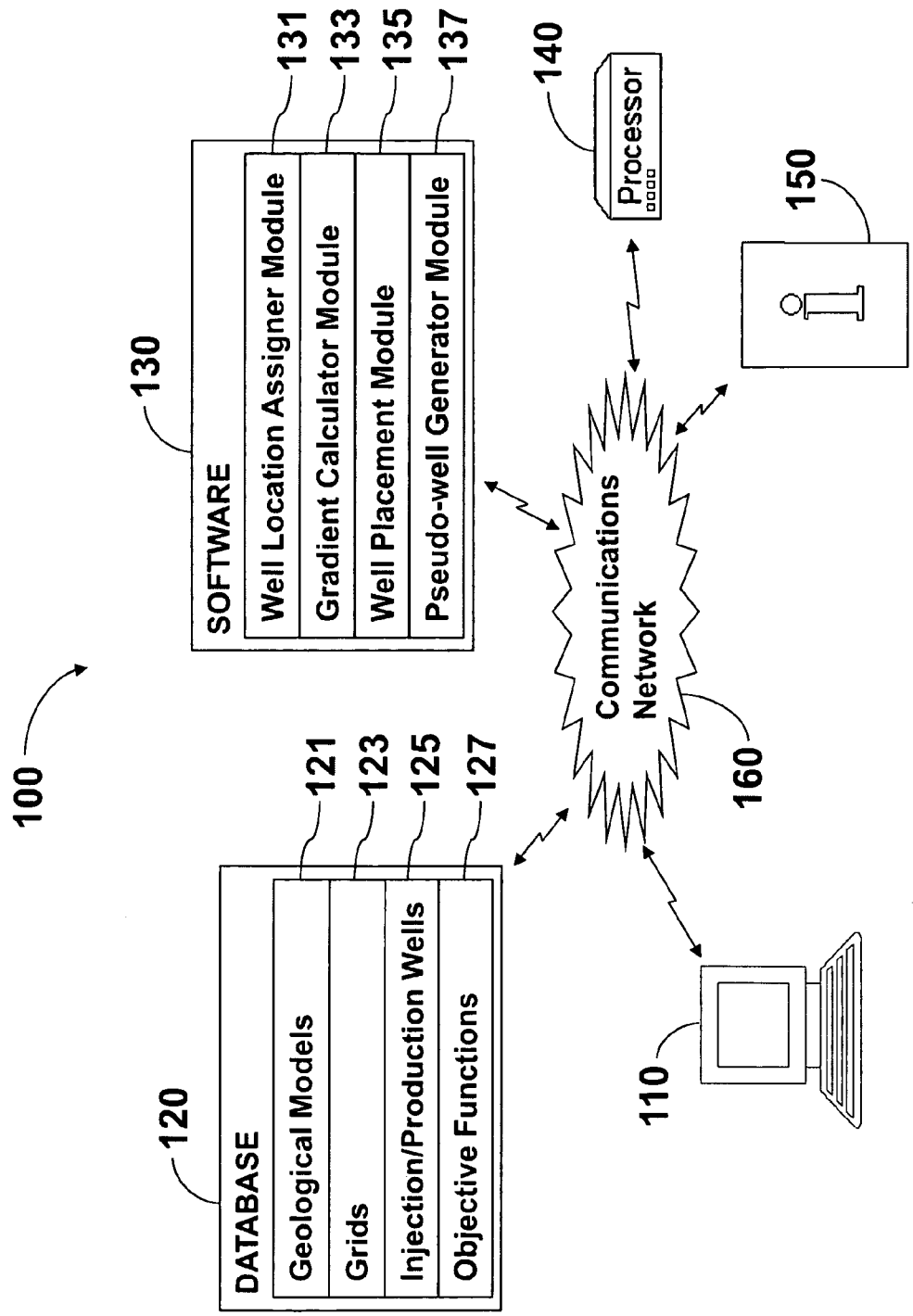
FIG. 5 is a schematic diagram of a system for well placement optimization, in accordance with the present invention.

FIG. 5 illustrates a system 100 by which well placement optimization for a reservoir field is made according to an embodiment of the present invention. System 100 includes user interface 110, such that an operator can actively input information and review operations of system 100. User interface 110 can be anything by which a person is capable of interacting with system 100, which can include but is not limited to a keyboard, mouse, or touch-screen display. Input that is entered into system 100 through user interface 110 can be stored in a database 120. Additionally, any information generated by system 100 can also be stored in database 120. Geological models 121, grids 123, injection and production wells 125, and objective functions 127 are all examples of information that can be stored in database 120.

System 100 includes software 130 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 130 can include a plurality of modules for performing system tasks. Processor 140 interprets instructions to execute software 130 and generates automatic instructions to execute software for system 100 responsive to predetermined conditions. Instructions from both user interface 110 and software 130 are processed by processor 140 for operation of system 100. In some embodiments, a plurality of processors can be utilized such that system operations can be executed more rapidly.

Examples of modules for software 130 include, but are not limited to, a well location assigner module 131, a gradient calculator module 133, a well placement module 135, and a pseudo-well generator module 137. Well location assigner module 131 is capable of associating a well location with a continuous spatial domain such that the well location is represented by continuous well location variables. Gradient calculator module 133 is capable of calculating a gradient of an objective function responsive to continuous well location variables. Well placement module 135 is capable of adjusting a well location responsive to a gradient of an objective function. Pseudo-well generator module 137 is capable of generating a pseudo-well in an area surrounding a well when the area contains a source/sink term greater than a predetermined amount.

In certain embodiments, system 100 can include reporting unit 150 to provide information to the operator or to other systems (not shown). For example, reporting unit 150 can be a printer, display screen, or a data storage device. However, it should be understood that system 100 need not include reporting unit 150, and alternatively user interface 110 can be utilized for reporting information of system 100 to the operator.

Communication between any components of system 100, such as user interface 110, database 120, software 130, processor 140 and reporting unit 150, can be transferred over a communications network 160. Communications network 160 can be any means that allows for information transfer. Examples of such a communications network 160 presently include, but are not limited to, a switch within a computer, a personal area network (PAN), a local area network (LAN), a wide area network (WAN), and a global area network (GAN). Communications network 160 can also include any hardware technology used to connect the individual devices in the network, such as an optical cable or wireless radio frequency.

In operation, system 100 is populated with information including a geological model 121 of a reservoir field, a grid 123 defining a plurality of cells that are associated with the geological model, one or more wells 125 located within the plurality of cells, and one or more objective functions 127. This information can be stored in database 120, and can be input by a user through user interface 110 or can be generated using software 130. For example, the user can input objective function 127, such that Net Present Value (NPV), ultimate hydrocarbon recovery, reservoir percentage yield, or a combination thereof, is maximized. This information can then be used by software 130 to optimize well placement.

Well location assigner module 131 of software 130 retrieves geological model 121, grid 123, wells 125, and objective function 127 from database 120 and associates the location of each well 125 with a continuous spatial domain. The location of each well 125 is therefore, represented by continuous well location variables. Gradient calculator module 133 of software 130 uses the continuous well location variables to calculate a gradient of objective function 127 for each well. Well placement module 135 of software 130 uses the gradient of objective function 127 calculated by gradient calculator module 133 to adjust the location of the well. If the adjusted well location is not in an optimized location, this process is repeated until the well is in the optimum location.

Continuous well location variables that represent the location of each well on the continuous spatial domain and gradients of objective functions can also be stored in database 120. For example, well location assigner module 131 can output continuous well location variables to database 120. Gradient calculator module 133 can retrieve continuous well location variables associated with wells from database 120 in order to calculate gradients of objective function. Gradient calculator module 133 can also output calculated gradients of objective functions to database 120. Well placement module 135 can then retrieve gradients of objective functions to adjust well locations.

Once the location of the well has been optimized, a visual representation of the reservoir field is generated based on the optimized location of the well. The visual representation can be displayed by either reporting unit 150 or user interface 110.

EXAMPLE 1

The following is a very simple example validating that the gradients calculated with the above approach are indeed the right gradient directions. In other words, it was to ensure the gradient direction of Net Present Value with respect to the injector location $x_\omega$ and $y_\omega$ obtained with the above-described approach is correct.

The simulation model is that of a simple two dimensional two-phase black oil model of a horizontal square reservoir with a quarter 5-spot pattern. The reservoir covers an area of 1476×1476 $ft^2$, has a thickness of 33 ft, and is modeled by a 45×45×1 horizontal grid. The fluid system is an essentially incompressible two-phase unit mobility oil-water system with zero connate water saturation and zero residual oil saturation. The porosity, which is at 0.3, and permeability, which is at 10 D, are completely homogeneous. The producers are placed at the four corners, and the objective is to find the location of the injector such that Net Present Value is maximized. All the wells are set at constant bottom hole pressure values, such that they are not changed during optimization, and the model is run for 950 days. Thus, the only unknowns in the optimization problem are the x and y locations of the injector.

Figure 6:
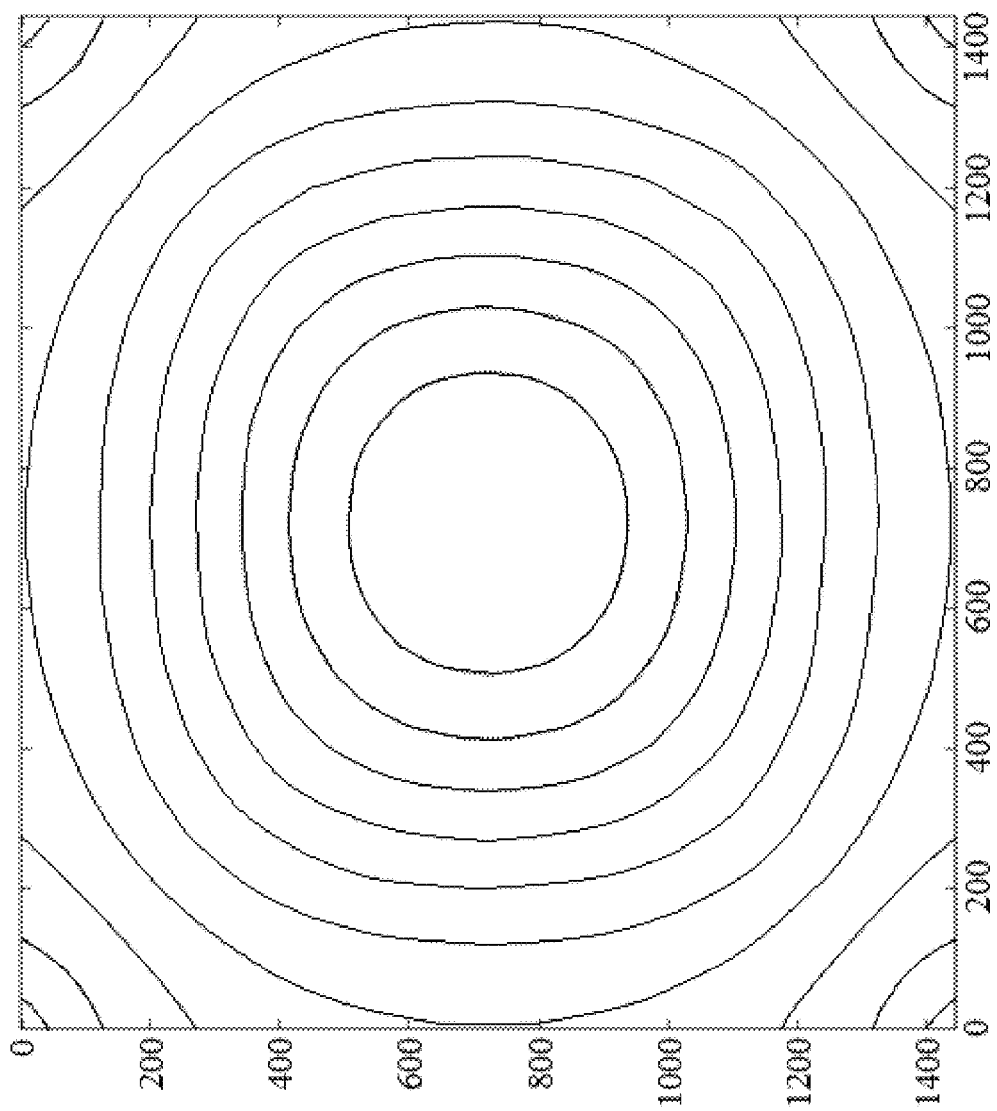
FIG. 6 is a representation illustrating contours of an objective function with respect to injector well location on the xy domain, in accordance with the present invention.
Figure 7A:
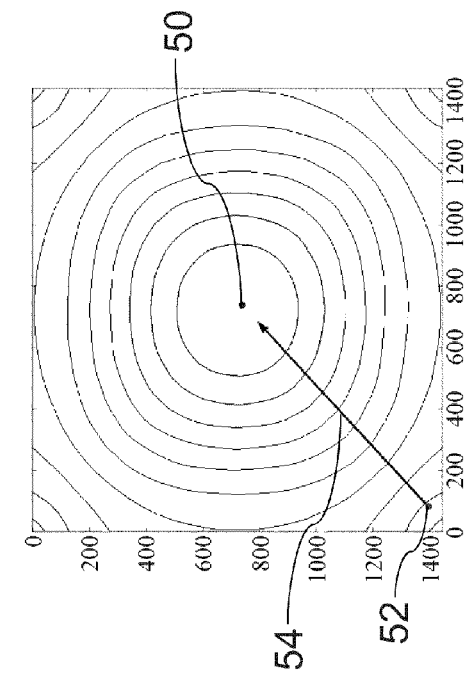
FIGS. 7A-7D are representations illustrating the gradient direction of the objective function shown in FIG. 6 with respect to injector well location, in accordance with the present invention.
Figure 7B:
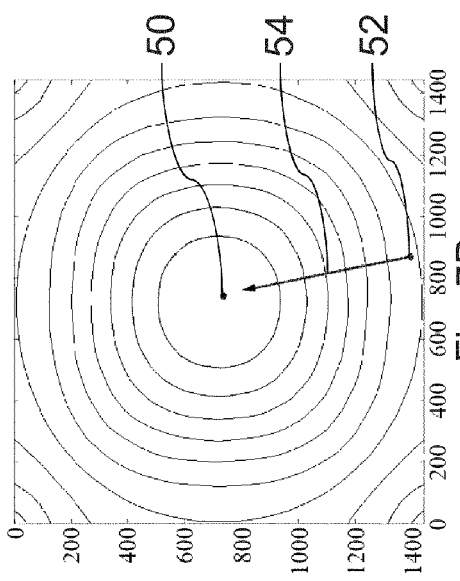
Figure 7C:
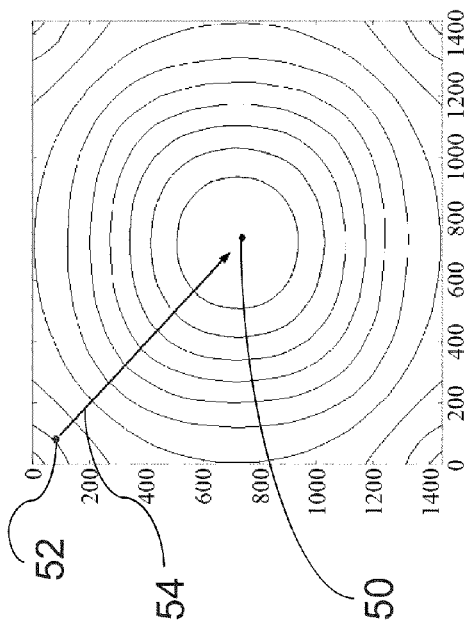
Figure 7D:
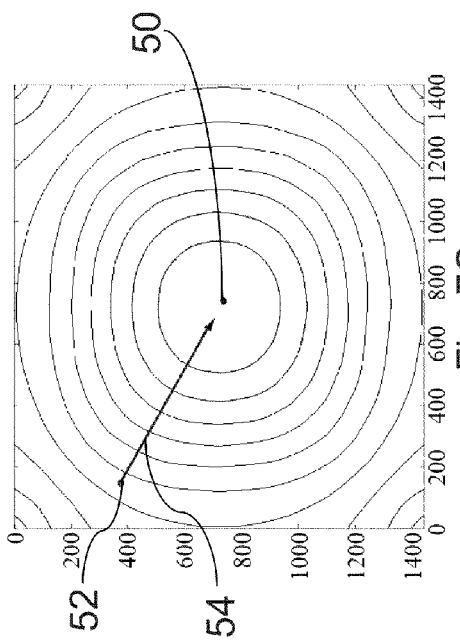

FIG. 6 illustrates the contours of the objective function over the entire search space. In order to do so, an exhaustive search was performed such that the injector was placed at all the 45*45=2025 grids and Net Present Value was calculated. It is clear that because the porosity and permeability are homogeneous, and the model is completely symmetric, the objective function is a nice convex function with the maximum at the center. The maximum Net Present Value was obtained when the injector was located at the center as expected.

FIGS. 7A-D illustrate the calculated gradient direction for the injector well placed at various different locations plotted with the contours of the objective function. In FIGS. 7A-D, point 50 is the optimum, point 52 is the injector location where the gradient is calculated, and the black arrow 54 is the negative of the gradient direction (steepest ascent direction) calculated with proposed algorithm. It is clear that for all cases, the gradient direction obtained was the right gradient direction as this direction is orthogonal to the contour line at the injector location for all cases. Further, for this very simple, convex and almost bowl shaped objective function, the gradient direction pointed toward the optimum for all well locations shown above. This implies that for all the above starting points, the optimum will be obtained in one iteration with any gradient-based optimization algorithm.

EXAMPLE 2

Figure 8:
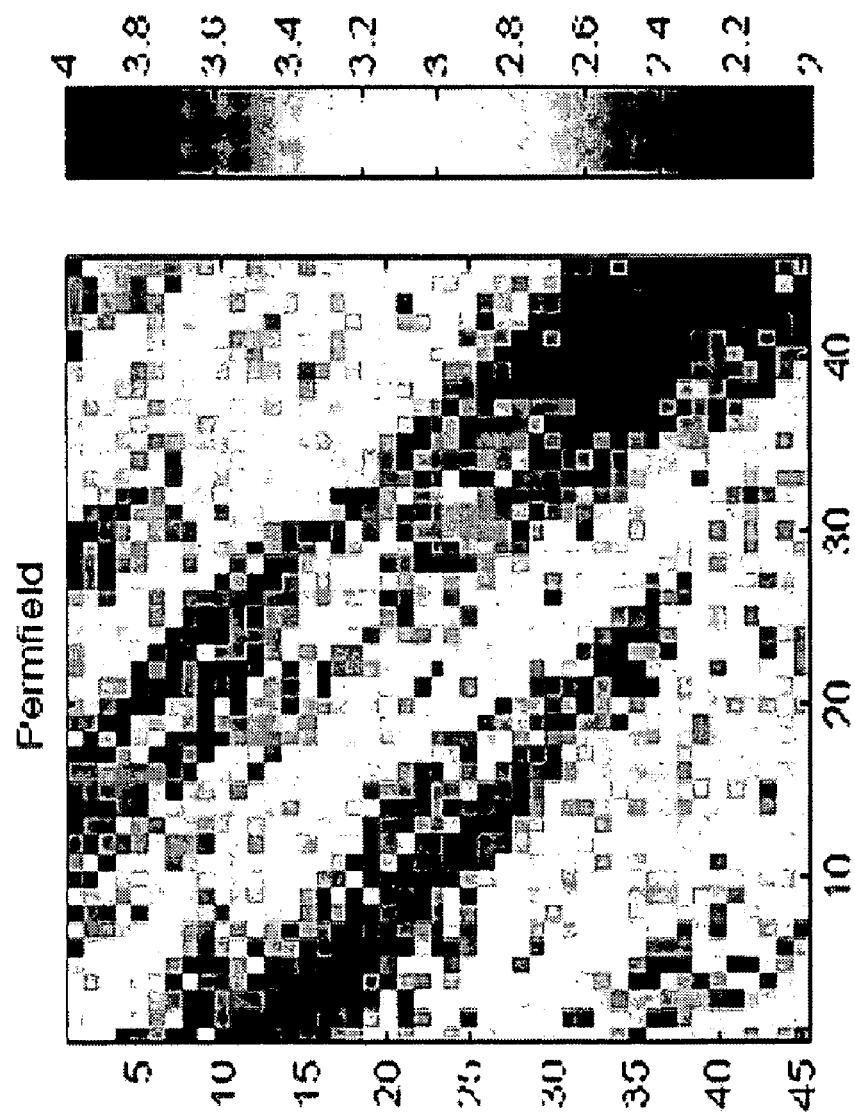
FIG. 8 is a schematic of a multi-Gaussian permeability field, in accordance with the present invention.

FIG. 8 illustrates an example that is similar to Example 1, except for having a heterogeneous permeability field with permeabilities ranging from 100 mD to 10 D. This was generated using Sequential Gaussian Simulation (SGSIM) software. Once the permeability field was generated, the optimal location of the injector can be determined such that Net Present Value is maximized over a period of 950 days.

Figure 9:
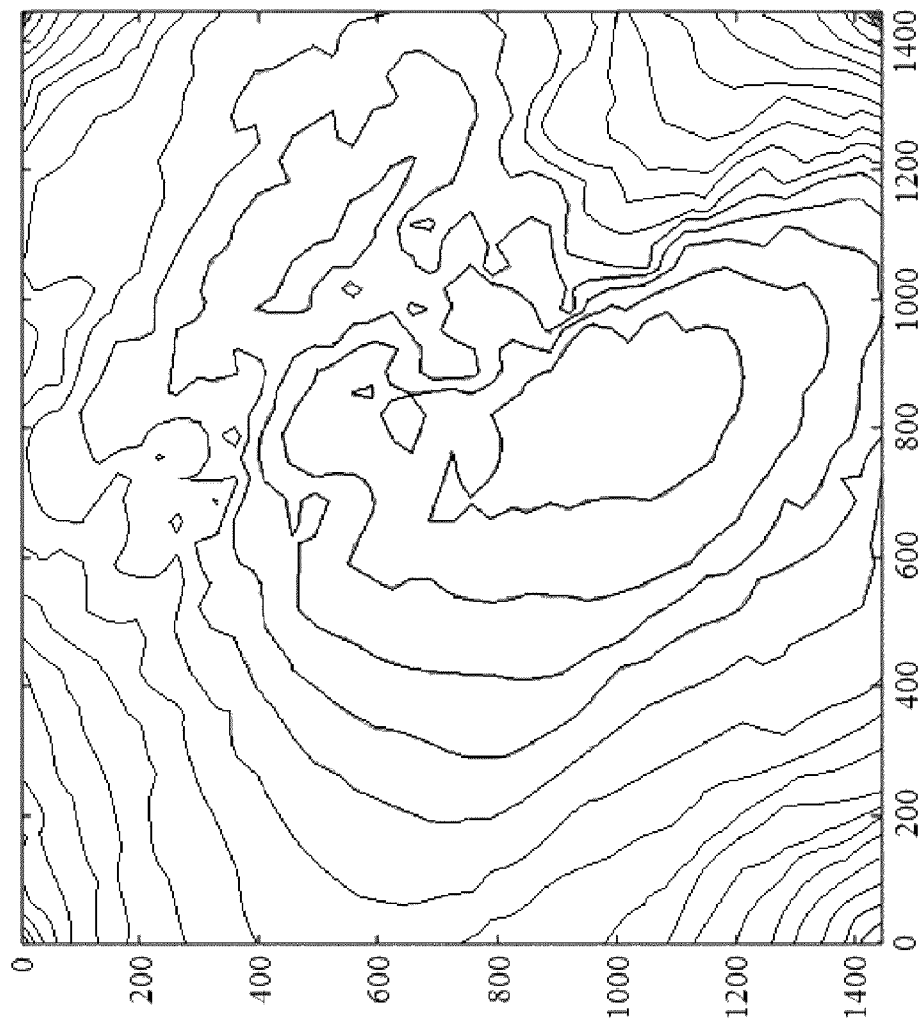
FIG. 9 is a representation illustrating the contours of an objective function with respect to the permeability field shown in FIG. 8, in accordance with the present invention.
Figure 10A:
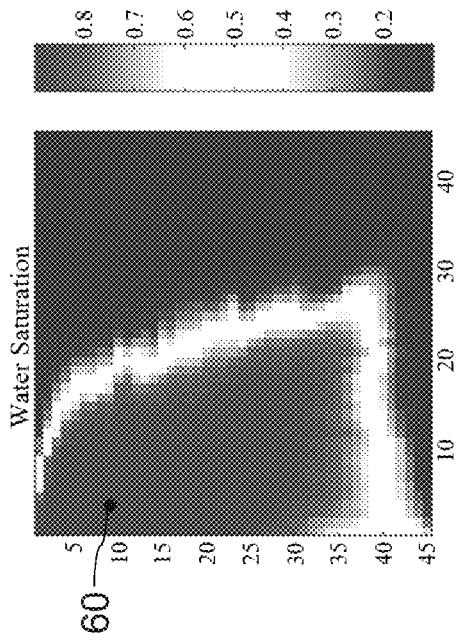
FIG. 10A is a representation depicting an initial well location plotted on the contours shown in FIG. 9, in accordance with the present invention.
Figure 10B:
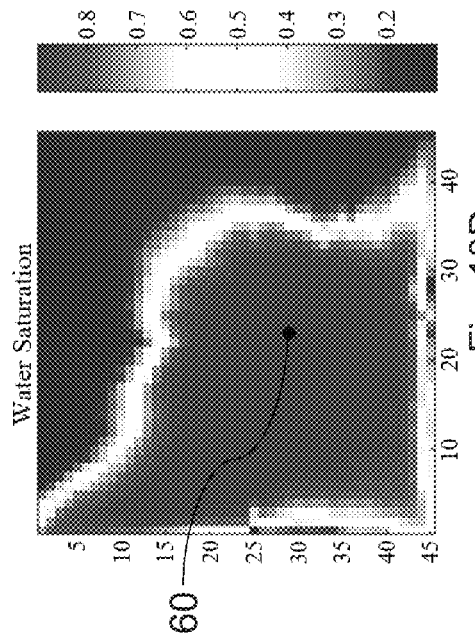
FIG. 10B is a final water saturation map for the injector well shown in FIG. 10A, in accordance with the present invention.
Figure 10C:
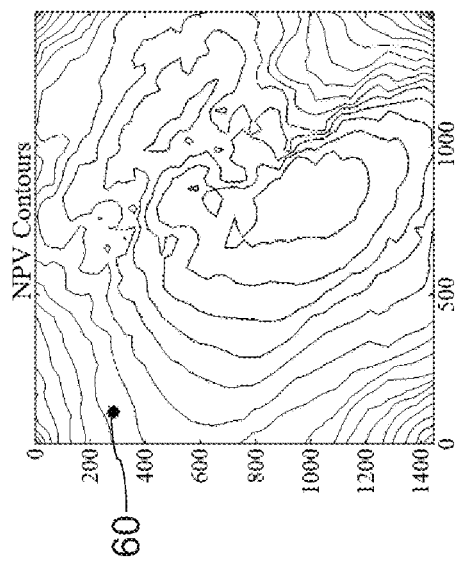
FIG. 10C is a representation depicting an optimized well location starting from the well location shown in FIG. 10A plotted on the contours shown in FIG. 9, in accordance with the present invention.
Figure 10D:
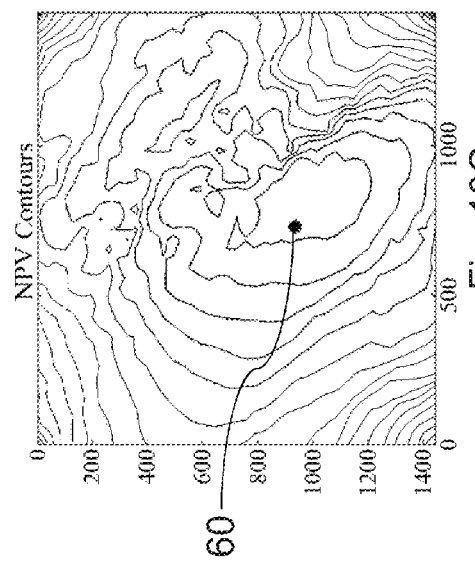
FIG. 10D is a final water saturation map for the injector well shown in FIG. 10C, in accordance with the present invention.
Figure 13A:
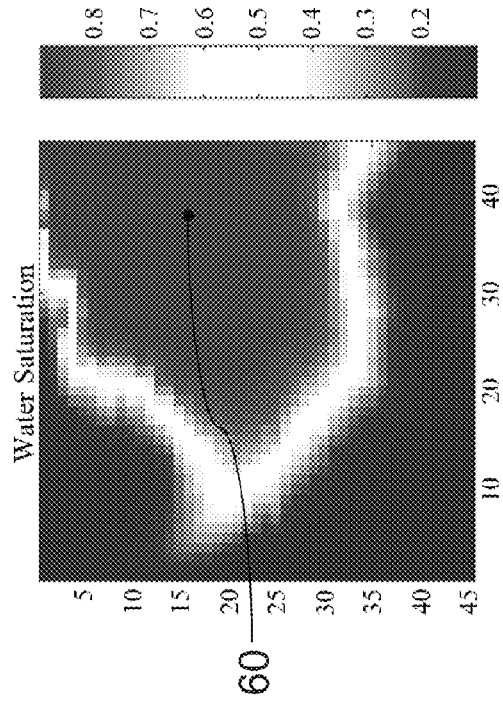
FIG. 13A is a representation depicting an initial well location plotted on the contours shown in FIG. 9, in accordance with the present invention.
Figure 13B:
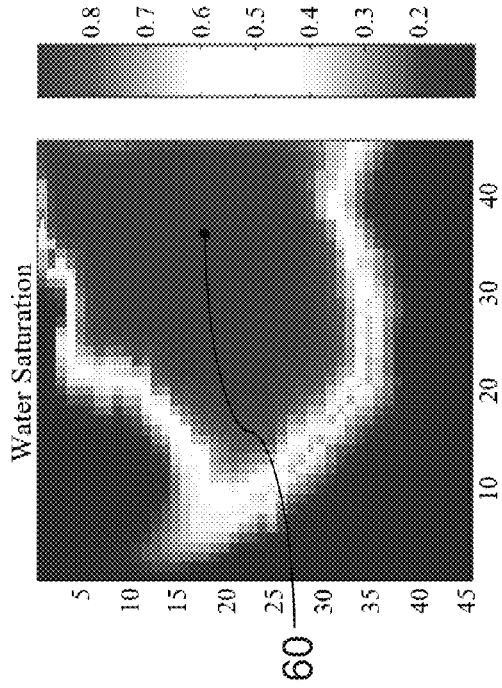
FIG. 13B is a final water saturation map for the injector well shown in FIG. 13A, in accordance with the present invention.
Figure 13C:
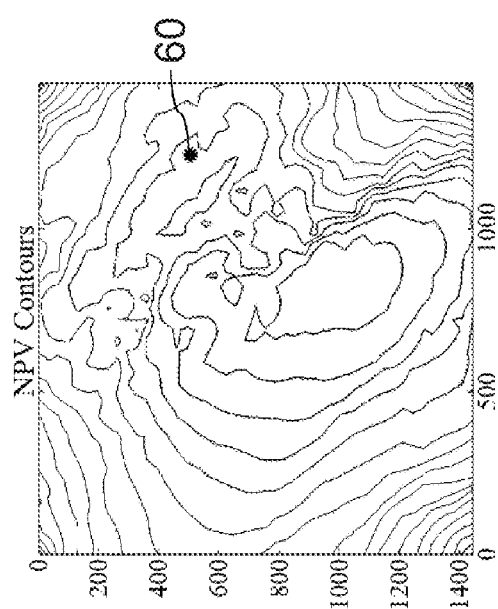
FIG. 13C is a representation depicting an optimized well location starting from the well location shown in FIG. 13A plotted on the contours shown in FIG. 9, in accordance with the present invention.
Figure 13D:
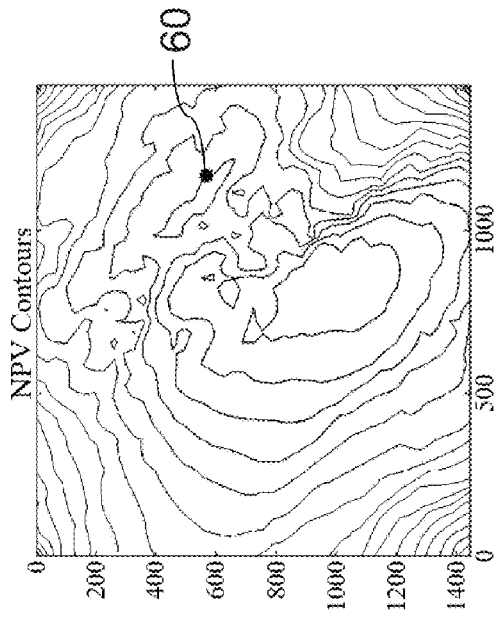
FIG. 13D is a final water saturation map for the injector well shown in FIG. 13C, in accordance with the present invention.

FIG. 9 illustrates the contours of Net Present Value, which were obtained by performing an exhaustive search over the entire search space. Therefore, the injector was again placed at all grid cells and Net Present Value was calculated. One observes that there was a large global maximum, but there were also quite a few local minimums.

FIG. 10A-D through 13A-D show the results of optimization using the projected gradient optimization algorithm with various initial guesses. In each, the left figures show the Net Present Value contours with the current injector location 60, and the right figures show the final water saturation after 950 days given the current injector location. The top figure in each case shows the initial guess, and the bottom figure shows the converged solution.

It is clear that in the first three cases, the operator is able to get to the global optimum. The first and third case each took four iterations, while the second case took eight iterations of the optimization algorithm. Each iteration typically requires about 4-5 simulations including adjoint simulations. Note that the line search algorithm currently implemented is quite simple and there is scope of further reduction in the number of iterations. For the fourth case shown in FIGS. 13A-D, the initial guess was quite close to a local optimum and the operator gets stuck at the local optimum. This is expected as gradient-based algorithms are local algorithms. However, given the nature of the objective function for this case, it is clear that the global optimum will be obtained starting from most locations except possibly from regions close to the local optima.

EXAMPLE 3

In this example, the simulation model was of a two-dimensional two-phase black oil model of a horizontal square reservoir with four injectors and nine producers. The reservoir covered an area of 3333×3333 $ft^2$ and had a thickness of 33 ft. It was modeled by a 101×101×1 horizontal grid. The fluid, rock, and rock-fluid properties were the same as Example 2 with a homogeneous porosity of 0.2.

Figure 14:
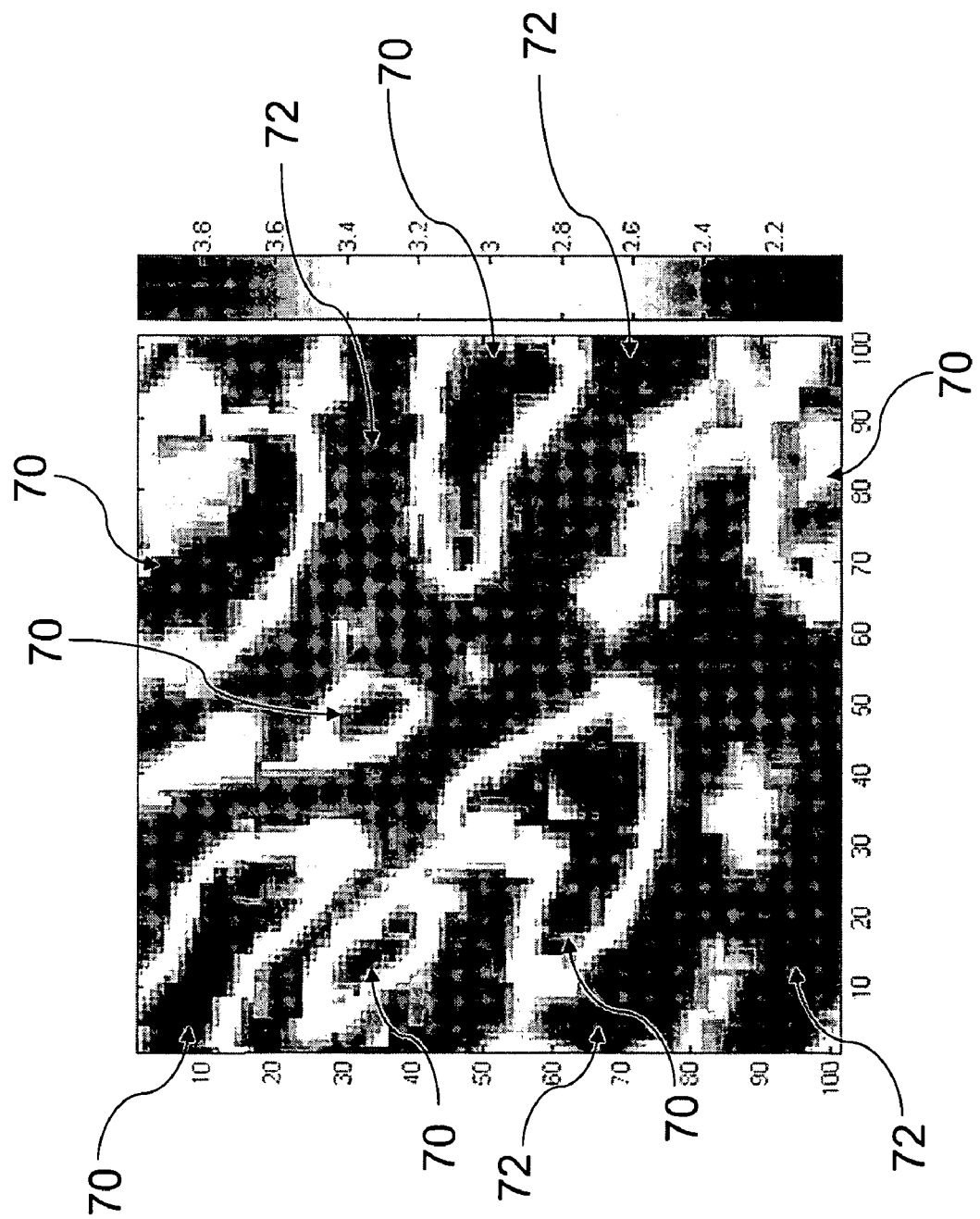
FIG. 14 is a schematic of a channelized permeability field, in accordance with the present invention.

FIG. 14 illustrates the permeability field (log perm) of this example, which was generated using a multi-point geostatistical algorithm called FILTERSIM, which is an algorithm well known in field of geostatistical earth modeling. In FIG. 14, the portions 70 represent a low permeability and the portions 72 represent high permeability channels. The optimal locations of all of the thirteen wells, such that Net Present Value is maximized, can then be determined. All the wells were set at constant bottom hole pressure values, such that they were not changed during optimization, and the model was run for a 1900 day simulation.

Figure 15:
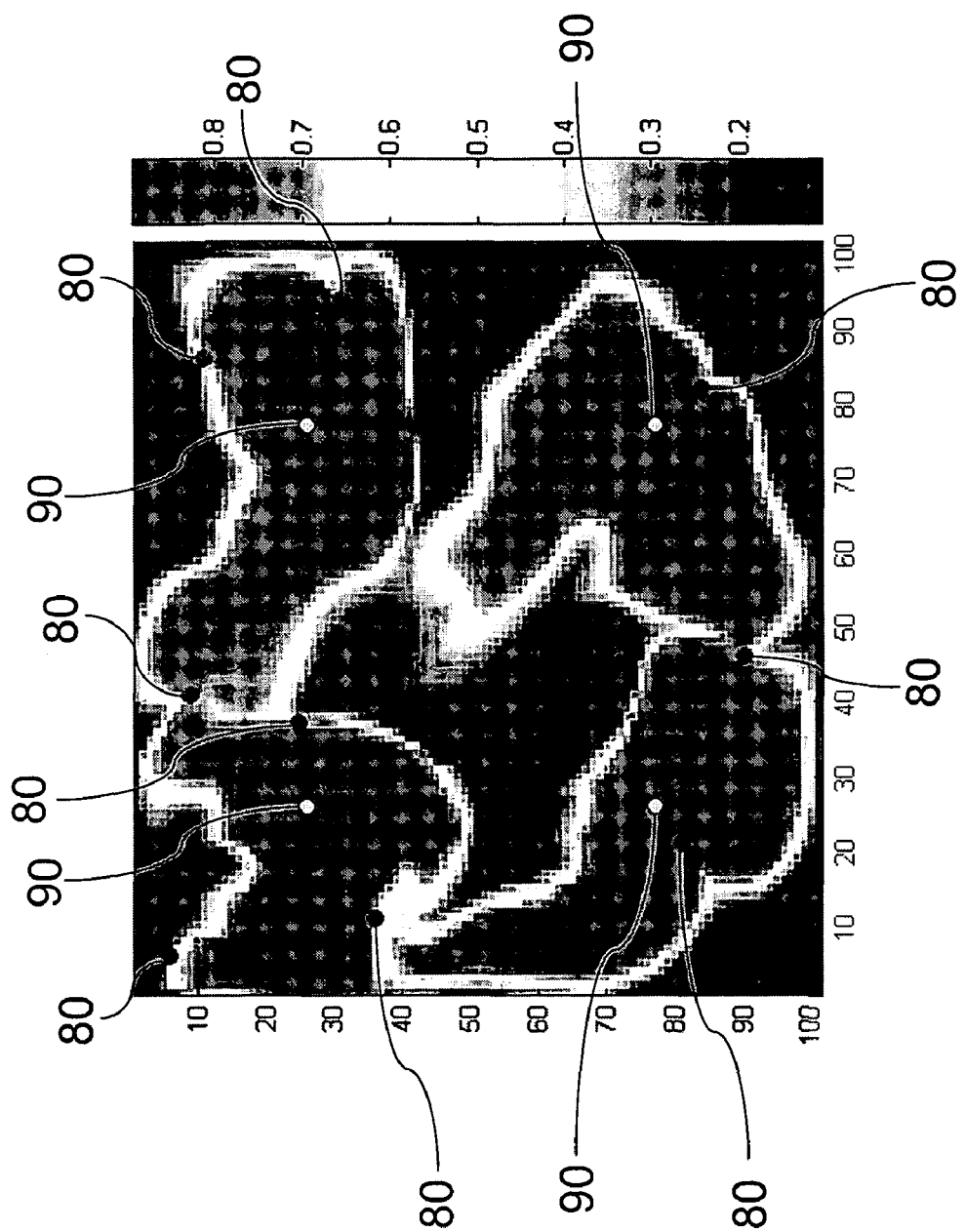
FIG. 15 is a final water saturation map for an initial well configuration with respect to the permeability field shown in FIG. 14, in accordance with the present invention.

FIG. 15 illustrates the optimization with an arbitrary initial guess for the well locations where producer wells are shown as dark circles 80 and the injector wells are shown as light circles 90. FIG. 15 also shows the final water saturation map after 1900 days for this well configuration.

Figure 16:
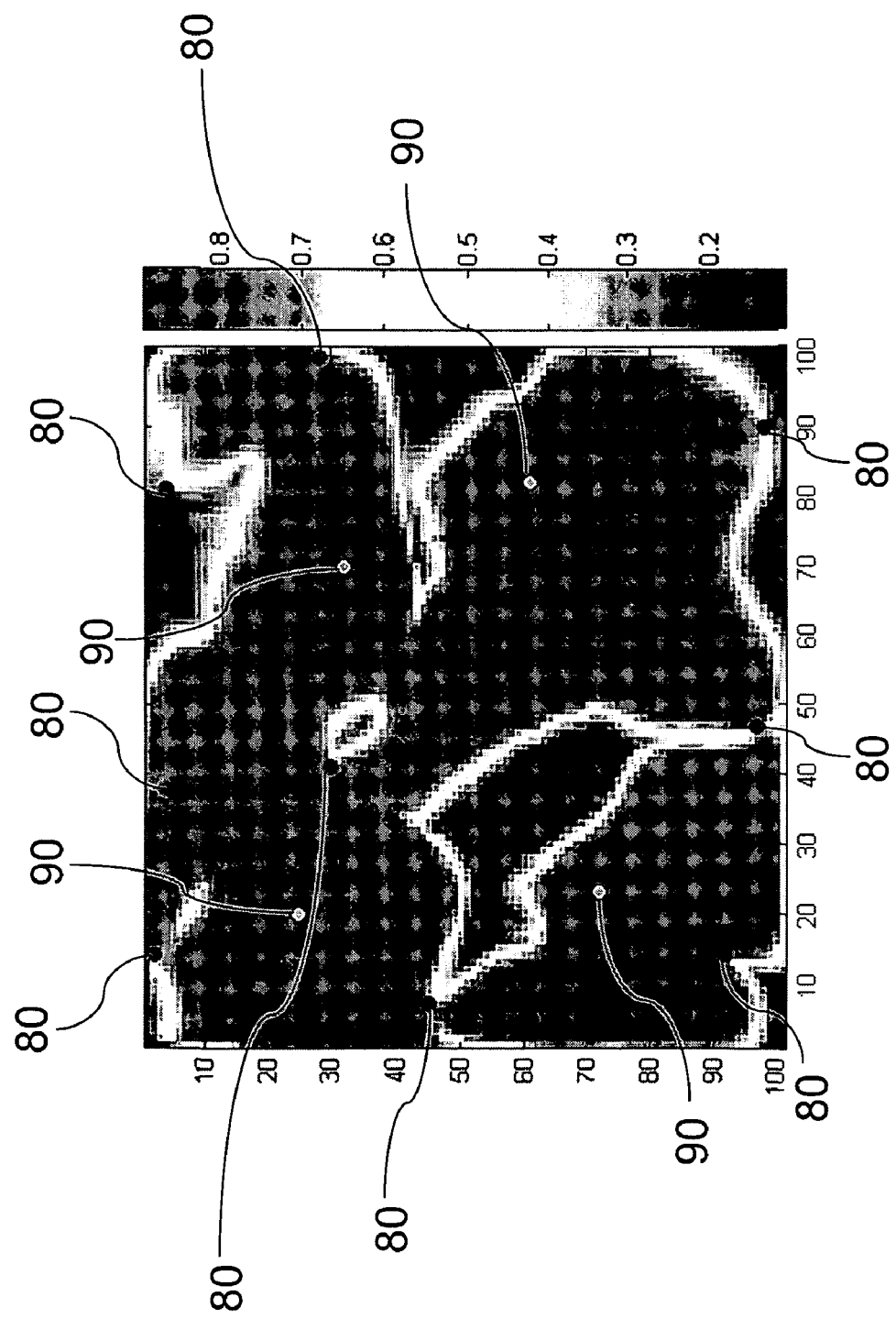
FIG. 16 is a final water saturation map for the optimized well configuration with respect to the permeability field shown in FIG. 14, in accordance with the present invention.

FIG. 16 illustrates the final water saturation map and well locations after convergence of the optimization algorithm. Optimization took four iterations resulting in about twenty simulations, which is a very reasonable and affordable number of simulations.

Figure 17:
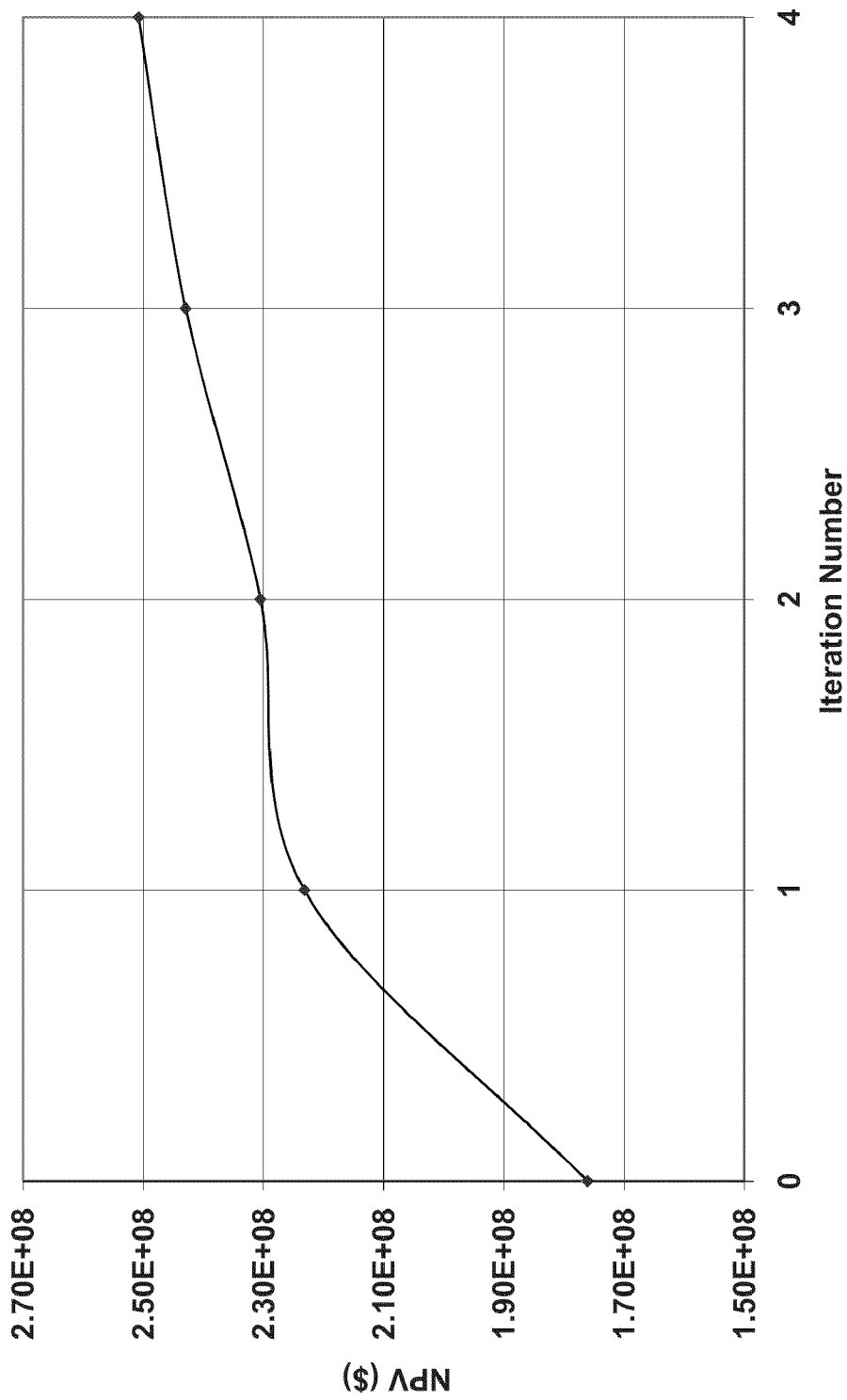
FIG. 17 is a graph comparing the Net Present Value respectively for iterations of the well configuration during optimization, in accordance with the present invention.

FIG. 17 illustrates the increase in Net Present Value is quite significant at about 40% over the iterations.

Figure 18:
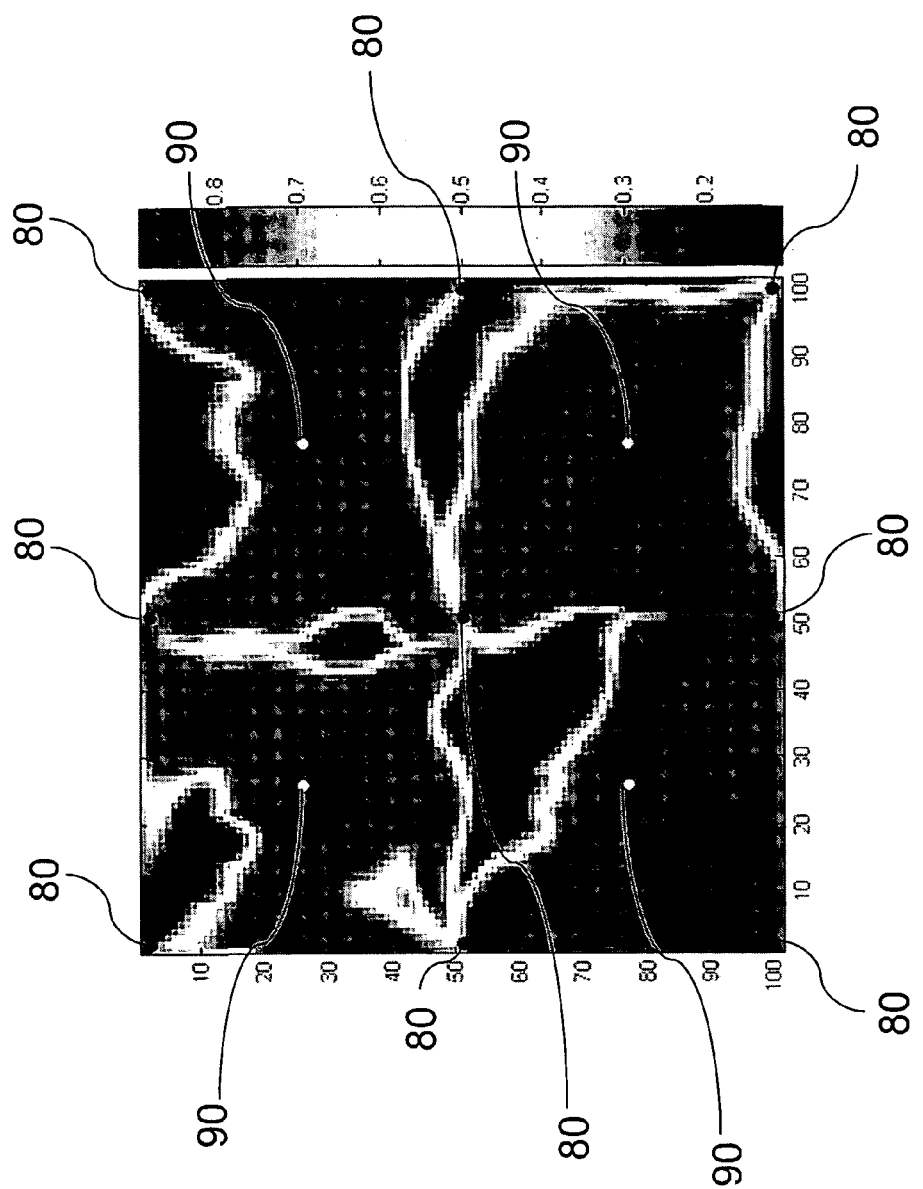
FIG. 18 is a final water saturation map for a standard pattern drive.

FIG. 18 illustrates the final water saturation map for a standard pattern drive as a comparison. The sweep efficiency and Net Present Value were improved through optimization by about 8% compared to this pattern drive.

The system and method described herein optimize well placement in a reservoir field in an efficient and rigorous manner. Optimization can even be achieved for large-scale simulation models with a large number of wells. In comparison to previous well placement optimization system and methods, a direct application of gradient-based techniques is implemented. The actual gradient with respect to the well location variables is obtained and any arbitrary search direction is possible at each iteration. Convergence can be achieved with only a few iterations and a monotonically increasing objective function is guaranteed with successive iterations.

While the invention has been shown in only some of its forms, it should be apparent to those skilled in the art that it is not so limited, but susceptible to various changes without departing from the scope of the invention. For example, alternative continuous approximation functions that preferably tend in the limit to the Dirac-delta function may be utilized in lieu of the bivariate Gaussian function. Further, the same methodology can be easily extended to three-dimensional problems and also to problems where the wells are deviated from the vertical.

What is claimed is:

1. A method to optimize well placement in a reservoir field, the method comprising:
   (a) providing a geological model of a reservoir field, a grid defining a plurality of cells that are associated with the geological model, a well to be located within the plurality of cells, and an objective function;
   (b) associating the location of the well with a continuous spatial domain such that the location of the well is represented by continuous well location variables;
   (c) calculating, through a data processor, a gradient of the objective function responsive to the continuous well location variables;
   (d) adjusting the location of the well responsive to the gradient of the objective function; and
   (e) repeating steps (c) and (d) until the location of the well is in an optimized location.

2. The method of claim 1, wherein the calculating the gradient of the objective function responsive to the continuous well location variables in step (c) is performed using a well term that has a non-zero magnitude in each of the plurality of cells.

3. The method of claim 2, wherein a pseudo-well is added to each cell in which the magnitude of the well term is greater than a predetermined amount.

4. The method of claim 2, wherein the magnitude of the well term for each cell is based on the cells distance to the location of the well.

5. The method of claim 1, wherein the calculating the gradient of the objective function responsive to the continuous well location variables in step (c) is performed using a governing partial differential equation that includes a continuous approximation for a well term.

6. The method of claim 5, wherein the continuous approximation in the limit behaves as a Dirac-delta function.

7. The method of claim 5, wherein the continuous approximation is a bivariate Gaussian function.

8. The method of claim 5, wherein numerical discretization of the governing partial differential equation leads to well terms in mass balance equations that are continuous functions of the continuous well location variables.

9. The method of claim 1, wherein the calculating the gradient of the objective function responsive to the continuous well location variables in step (c) is performed with one of numerical perturbation and adjoint models.

10. The method of claim 1, further comprising generating a visual representation of the reservoir field, the visual representation illustrating at least one of the well in the optimized location, a saturation map, and a net present value amount.

11. The method of claim 1, wherein the objective function includes maximizing one of net present value, ultimate hydrocarbon recovery, and reservoir percentage yield.

12. The method of claim 1, wherein the associating the location of the well with the continuous spatial domain such that the location of the well is represented by continuous well location variables in step (b) further comprises providing governing partial differential equations that include continuous approximations for well terms such that numerical discretization of the governing partial differential equations leads to well terms in mass balance equations that are continuous functions of the continuous well location variables.

13. A system to optimize well placement in a reservoir field, the system comprising:
    a computer processor;
    a database that stores system information, the system information comprising a geological model of a reservoir field, a grid defining a plurality of cells that are associated with the geological model, a well having a location within the plurality of cells, and an objective function;
    a software program executable on the computer processor, the software program comprising:
      a well location assigner module that associates the location of the well with a continuous spatial domain such that the location of the well is represented by continuous well location variables;
      a gradient calculator module that calculates the gradient of the objective function responsive to the continuous well location variables; and
      a well placement module that adjusts the location of the well responsive to the gradient of the objective function until the well is in an optimized location; and
    a display in communication with the software program for displaying a visual representation of the reservoir field responsive to the optimized location of the well.

14. The software program of claim 13, further comprising:
    a pseudo-well generator module that generates a pseudo-well in at least one cell when the at least one cell contains a well term greater than a predetermined amount, the well term being calculated by the gradient calculator module.

15. The software instruction of claim 13, wherein the well location assigner module further provides governing partial differential equations that include continuous approximations for well terms such that numerical discretization of the governing partial differential equations leads to well terms in mass balance equations that are continuous functions of the continuous well location variables.

16. A non-transitory processor readable medium containing computer readable software instructions used for optimizing well placement in a reservoir field, the software instructions comprising:
    a well location assigner module that associates a location of a well within a reservoir field with a continuous spatial domain such that the location of the well is represented by continuous well location variables;
    a gradient calculator module that calculates the gradient of an objective function responsive to the continuous well location variables; and
    a well placement module that adjusts the location of the well responsive to the gradient of the objective function until the well is in an optimized location within the reservoir field.

17. The software instruction of claim 16, further comprising:
    a pseudo-well generator module that generates a pseudo-well in an area surrounding the well when the area contains a well term greater than a predetermined amount, the well term being calculated by the gradient calculator module.

18. The software instruction of claim 16, wherein the well location assigner module further provides governing partial differential equations that include continuous approximations for well terms such that numerical discretization of the governing partial differential equations leads to well terms in mass balance equations that are continuous functions of the continuous well location variables.

* * * * *